(12) United States Patent
Wong et al.

(10) Patent No.: US 8,318,126 B2
(45) Date of Patent: Nov. 27, 2012

(54) METHODS OF MAKING METAL OXIDE NANOSTRUCTURES AND METHODS OF CONTROLLING MORPHOLOGY OF SAME

(76) Inventors: Stanislaus S. Wong, Stony Brook, NY (US); Hongjun Zhou, Austin, TX (US)

( * ) Notice: Subject to any disclaimer, the term of this patent is extended or adjusted under 35 U.S.C. 154(b) by 2 days.

(21) Appl. No.: 12/773,651

(22) Filed: May 4, 2010

(65) Prior Publication Data

US 2010/0278720 A1     Nov. 4, 2010

Related U.S. Application Data

(60) Provisional application No. 61/215,427, filed on May 4, 2009.

(51) Int. Cl.
| | |
|---|---|
| C01B 13/14 | (2006.01) |
| C01G 3/02 | (2006.01) |
| C01G 45/02 | (2006.01) |
| C01G 9/02 | (2006.01) |
| C01G 49/02 | (2006.01) |
| C01G 51/04 | (2006.01) |
| C01G 53/04 | (2006.01) |
| C01G 15/00 | (2006.01) |
| C01G 19/02 | (2006.01) |
| C01G 37/02 | (2006.01) |
| C01G 25/02 | (2006.01) |
| C01G 31/02 | (2006.01) |
| C01G 55/00 | (2006.01) |
| C01G 41/02 | (2006.01) |
| C01G 17/02 | (2006.01) |
| C01G 30/00 | (2006.01) |
| C01G 33/00 | (2006.01) |
| C01G 47/00 | (2006.01) |
| C01G 21/02 | (2006.01) |
| C01G 11/00 | (2006.01) |
| C01G 29/00 | (2006.01) |
| C01F 7/02 | (2006.01) |
| C01F 5/02 | (2006.01) |
| C01F 11/02 | (2006.01) |
| C01F 17/00 | (2006.01) |

(52) U.S. Cl. ............... 423/592.1; 423/604; 423/605; 423/606; 423/607; 423/608; 423/617; 423/618; 423/619; 423/622; 423/624; 423/625; 423/632; 423/635; 423/594.18; 423/594.19; 977/762; 977/763; 977/811

(58) Field of Classification Search ............ 977/762, 977/700, 763, 766, 773, 777, 811; 423/99, 423/604, 622, 632

See application file for complete search history.

(56) References Cited

U.S. PATENT DOCUMENTS

2007/0113779 A1 * 5/2007 Wong et al. ............ 117/84

OTHER PUBLICATIONS

Zhou et al, "A Facile and Mild Synthesis of 1-D ZnO, CuO, and a-Fe2O3 Nanostructures and Nanostructured Arrays", May 2, 2008, ACS Nano vol. 2, No. 5, pp. 944-958.*

(Continued)

Primary Examiner — Stanley Silverman
Assistant Examiner — Justin Bova
(74) Attorney, Agent, or Firm — Hoffmann & Baron, LLP

(57) ABSTRACT

The present invention includes a method of producing a crystalline metal oxide nanostructure. The method comprises providing a metal salt solution and providing a basic solution; placing a porous membrane between the metal salt solution and the basic solution, wherein metal cations of the metal salt solution and hydroxide ions of the basic solution react, thereby producing a crystalline metal oxide nanostructure.

16 Claims, 12 Drawing Sheets

OTHER PUBLICATIONS

Sun et al., "A Highly Efficient Chemical Sensor Material for H2S: alpha-Fe2O3 Nanotubes Fabricated Using Carbon Nanotube Templates", Advanced Materials, vol. 17, pp. 2993-2997; 2005.

Chen et al., "Alpha-Fe2O3 Nanotubes in Gas Sensor and Lithium-Ion Battery Applications", Advanced Materials, vol. 17, No. 5, pp. 582-586; 2005.

Gao et al., "Nanowire Piezoelectric Nanogenerators on Plastic Substrates as Flexible Power Sources for Nanodevices", Advanced Materials, vol. 19, pp. 67-72; 2007.

Park et al., "ZnO Nanoneedles Grown Vertically on Si Substrates by Non-Catalytic Vapor-Phase Epitaxy", Advanced Materials, vol. 14, No. 24, pp. 1841-1843; 2002.

Jeong et al., "Three-dimensional ZnO Hybrid Nanostructures for Oxygen Sensing Application", Nanotechnology, vol. 17, pp. 526-530; 2006.

Yang et al., "Controlled Growth of ZnO Nanowires and Their Optical Properties", Advanced Functional Materials, vol. 12, No. 5, pp. 323-331; 2002.

Umar et al., "Optical and Electrical Properties of ZnO Nanowires Grown on Aluminium Foil by Non-Catalytic Thermal Evaporation", Nanotechnology, vol. 18, pp. 1-7; 2007.

Sun et al., "Growth of Aligned ZnO Nanorod Arrays by Catalyst-Free Pulsed Laser Deposition Methods", Chemical Physics Letters, vol. 396, pp. 21-26; 2004.

Lionel Vayssieres, "Growth of Arrayed Nanorods and Nanowires of ZnO from Aqueous Solutions", Advanced Materials, vol. 15, No. 5, pp. 464-466; 2003.

Greene et al., "Low-Temperature Wafer-Scale Production of ZnO Nanowire Arrays", Angew. Chem. Int. Ed., vol. 42, pp. 3031-3034; 2003.

Greene et al., "General Route to Vertical ZnO Nanowire Arrays Using Textured ZnO Seeds", Nano Letters, vol. 5, No. 7, pp. 1231-1236; 2005.

Jiang et al., "CuO Nanowires Can Be Synthesized by Heating Copper Substrates in Air", Nano Letters, vol. 2, No. 12, 1333-1338; 2002.

Cheng et al., "Direct Observation of Short-Circuit Diffusion During the Formation of a Single Cupric Oxide Nanowire", Nanotechnology, vol. 18, pp. 245604-245608.

Cao et al., "A Controllable Synthetic Route to Cu, Cu2O and CuO Nanotubes and Nanorods", Chem. Commun., pp. 1884-1885; 2003.

Wen et al., "Copper-Based Nanowire Materials: Templated Syntheses, Characterizations, and Applications", Langmuir, vol. 21, pp. 4729-4737; 2005.

Du et al., "Cu(OH)2 Nanowires, CuO Nanowires and CuO Nanobelts", Chemical Physics Letters, vol. 393, pp. 64-69; 2004.

Lu et al., "Simple Template-Free Solution Route for the Controlled Synthesis of Cu(OH)2 and CuO Nanostructures", J. Phys. Chem. vol. 108, pp. 17825-17831; 2004.

Zhang et al., "Growth of Novel Nanostructured Copper Oxide (CuO) Films on Copper Foil", Journal of Crystal Growth, vol. 291, pp. 479-484; 2006.

Wu et al., "Fabrication, Assembly, and Electrical Characterization of CuO Nanofibers", Applied Physics Letters, vol. 89, pp. 133125 1-3; 2006.

Malandrino et al., "Free-Standing Copper(II) Oxide Nanotube Arrays through an MOCVD Template Process", Chemical Materials, vol. 16, pp. 5559-5561; 2004.

Su Yi-kun et al., Controlled Synthesis of Highly Ordered CuO Nanowire Arrays by Template-Based Sol-Gel Route, Transactions of Nonferrous Metals Society of China, vol. 17, pp. 783-786; 2007.

Fu et al., "Synthesis of Large Arrays of Aligned alpha-Fe2O3 Nanowires", Chemical Physics Letters, vol. 379, pp. 373-379; 2003.

Wen et al., "Controlled Growth of Large-Area, Uniform, Vertically Aligned Arrays of alpha-Fe2O3 Nanobelts and Nanowires", J. Phys. Chem, vol. 109, pp. 215-220; 2005.

Wang et al., "Synthesis of Beta-FeOOH and alpha-Fe2O3 Nanorods and Electrochemical Properties of Beta-FeOOH", J. Mater. Chem. vol. 14, pp. 905-907; 2004.

Xiong et al., "Thermally Stable Hematite Hollow Nanowires", Inorganic Chemistry, vol. 43, No. 21, pp. 6540-6542; 2004.

Morber et al., "PLD-Assisted VLS Growth of Aligned Ferrite Nanorods, Nanowires, and Nanobelts-Synthesis, and Properties", vol. 110, pp. 21672-21679; 2006.

Shen et al. "An Efficient Template Pathway to Synthesis of Ordered Metal Oxide Nanotube Arrays Using Metal Acetylacetonates as Single-Source Molecular Precursors", Chemistry Letters, vol. 33, No. 9, pp. 1128-1129; 2004.

Hulteen et al., "A General Template-Based Method for the Preparation of Nanomaterials", J. Mater. Chem, vol. 7, No. 7, pp. 1075-1087; 1997.

Charles R. Martin, "Nanomaterials: A Membrane-Based Synthetic Approach", Science, vol. 266, pp. 1961-1966; 1994.

Charles R. Martin, "Membrane-Based Synthesis of Nanomaterials", Chem. Mater, vol. 8, pp. 1739-1746; 1996.

Mao et al., "General, Room-Temperature Method for the Synthesis of Isolated as Well as Arrays of Single-Crystalline ABO4-Type Nanorods", Journal of American Chemical Society, vol. 126, pp. 15245-15252; 2004.

Mao et al., "Ambient Template-Directed Synthesis of Single-Crystalline Alkaline-Earth Metal Fluoride Nanowires", Advanced Materials, vol. 18, pp. 1895-1899; 2006.

Martin et al., "Template Synthesis of Organic Microtubules", Journal of American Chemical Society, vol. 112, pp. 8976-8977; 1990.

Liang et al., "Gas Transport in Electronically Conductive Polymers", Chemical Material, vol. 3, pp. 390-391; 1991.

Cochran et al., "Template-Based, Near-Ambient Synthesis of Crystalline Metal-Oxide Nanotubes, Nanowires and Coaxial Nanotubes", Acta Materialia, vol. 55, pp. 3007-3014; 2007.

Liu et al., "Surfactant-Assisted Synthesis of alpha-Fe2O3 Nanotubes and Nanorods with Shape-Dependent Magnetic Properties", J. Phys. Chem, vol. 110, pp. 15218-15223; 2006.

Zysler et al., "Surface Effect in the Magnetic Order of Antiferromagnetic Nanoparticles", Physica B, vol. 384, pp. 277-281; 2006.

Drijvers et al., "Decomposition of Phenol and Tricholoroethylene by the Ultrasound/H2O2/CuO Process", Wat. Res., vol. 33, No. 5, pp. 1187-1194; 1999.

* cited by examiner

METHODS OF MAKING METAL OXIDE NANOSTRUCTURES AND METHODS OF CONTROLLING MORPHOLOGY OF SAME

CROSS-REFERENCE TO RELATED APPLICATION

This application claims the benefit of U.S. Provisional Application No. 61/215,427, filed May 4, 2009, which is incorporated herein by reference in its entirety.

This invention was made with Government support from the National Science Foundation under CAREER Award DMR-0348239 and the U.S. Department of Energy under Grant No. DE-AC02-98CH10886. The Government has certain rights in this invention.

BACKGROUND OF THE INVENTION

Though carbon nanotubes are the best known examples of one-dimensional (1-D) systems, the synthesis and characterization of metal oxide nanotubes and nanowires are equally critical because of the intrinsic importance of 1-D structures as model systems for the efficient transport of electrons and optical excitations (Hu et al., *Acc. Chem. Res.* 1999, 32, 435-445; Ijima, S. *Nature* 1991, 354-56-58). The quantum confinement and low-dimensionality inherent to these systems allow for the generation of materials with unique properties, such as a higher luminescence efficiency (Holmes et al., *Science* 2000, 287, 1471-1473) and a lowered lasing threshold (Arakawa et al., *Appl. Phys. Lett.* 1982, 40, 939-941) as compared with the bulk. Moreover, 1-D systems can be used as building blocks for the next generation of nanoscale optical, electronic, photoelectrochemical, and photovoltaic devices (Cui et al., *Science* 2001, 291, 851-853; Huang et al., *Science* 2001, 292, 1897-1899). A lot of effort has been expended in overcoming numerous challenges associated with the efficient design of 1-D materials possessing well-defined and reproducible size, shape, monodispersity, purity, chemical composition, and crystallinity (Xia et al., *Adv. Mater.* 2003, 15, 353-389). The binary oxides of transition metal elements, such as Zn, Cu, and Fe, in particular, represent one of the most diverse classes of materials with important size-dependent optical, electronic, thermal, mechanical, chemical, and physical properties, with a wide range of correspondingly diverse applications, including energy storage and sensing (Fan et al., *Appl. Phys. Lett.* 2004, 85, 5923-5925; Johnson et al., *Nano Lett.* 2004, 4, 197-204; Law et al., *J. Phys. Chem. B* 2006, 110, 22652-22663; Johnson et al., *J. Phys. Chem. B.* 2001, 105, 11387-11390; Law et al., *Nat. Mater.* 2005, 4, 455-459; Sun et al., *Adv. Mater.* 2005, 17, 2993-2997; Chen et al., *Adv. Mater.* 2005, 17, 582-586; and Zhu et al., *Nanotechnology* 2005, 16, 88-92).

ZnO is a key, II-VI compound semiconductor, with particularly attractive properties such as a direct wide band gap (3.37 eV), a large exciton binding energy (60 meV at room temperature), and an exciton Bohr radius in the range of 1.4-3.5 nm (Reynolds et al., *Phys. Rev. B* 1998, 57, 12151-12155). Moreover, ZnO possesses a high breakdown voltage, good piezoelectric characteristics, biocompatibility, as well as high mechanical, thermal, and chemical stability. All of these favorable properties render this material highly versatile for a host of optoelectronic applications including room-temperature ultraviolet lasers (Huang et al., *Science* 2001, 292, 1897-1899), photodetectors (Kind et al., *Adv. Mater.* 2002, 14, 158-160; Soci et al., *Nano Lett.* 2007, 7, 1003-1009), dye-sensitized solar cells (Law et al., *Nat. Mater.* 2005, 4, 455-459; Suh et al., *Chem. Phys. Lett.* 2007, 442, 348-353), and field-effect transistors (Goldberger, et al., *J. Phys. Chem. B* 2005, 109, 9-14; Noh et al., *Appl. Phys. Lett.* 2007, 91, 043109-1-043109-3; Wang et al., *Adv. Mater.* 2007, 19, 1627-1631). ZnO nanowire arrays have been utilized as field emission sources as well as power generators for nanoscale devices (Wang et al., *Science* 2006, 312, 242-246; Gao et al., *Adv. Mater.* 2007, 19, 67-72; Wang et al., *Nano Lett.* 2007, 7, 2475-2479).

ZnO nanowires and nanowire arrays have been previously synthesized via both vapor and solution phases. Typical approaches were based on metal-organic chemical vapor deposition (MOCVO) (Park et al., *Adv. Mater.* 2002, 14, 1841-1943; Jeong et al., *Nanotechnology* 2006, 17, 526-530), chemical vapor transport (CVT) (Yang et al., *Adv. Funct. Mater.* 2002, 12, 323-331; Umar et al., *Nanotechnology* 2007, 18, 175606-1, 75606-7), and pulsed laser deposition (PLD) (Sun et al., *Chem. Phys. Lett.* 2004, 396, 21-26). These methods, while fully capable of generating high-quality wires and arrays, do possess limitations. For instance, gas-phase methods tend to involve the use of high temperatures (e.g., 450-900° C.), potentially toxic precursors, and a very limited range of substrates in order to induce and direct the growth of ZnO nanowires. Moreover, PLD is not an inexpensive method of producing ZnO nanostructures. Solution-based methodologies also exist for ZnO formation (Vayssieres L., *Adv. Mater.* 2003, 15, 464-466). As an illustrative example, layers of ZnO seed nanocrystals, measuring 5-10 nm in diameter, can be initially formed onto a Si substrate by thermally decomposing zinc acetate at 200-350° C., and this 50-200 nm film of crystal seeds can be subsequently grown into vertical nanowire arrays at 90° C. (Greene, et al., *Chem., Int. Ed.* 2003, 42, 3031-3034; Greene et al., *Nano Lett.* 2005, 5, 1231-1236). Recently, this methodology was extended to the growth of aligned ZnO nanowire arrays on a plastic film using Au nanocrystal seeds (Gao, et al., *Adv. Mater.* 2007, 19, 67-72).

As a p-type semiconductor with a narrow band gap (1.2 eV), CuO is a candidate material for photothermal and photoconductive applications (Jiang et al., *Nano Lett.* 2002, 2, 1333-1338; Musa et al., *Sol. Energy Mater. Sol. Cells* 1998, 51, 305-316). Moreover, it is also an effective heterogeneous catalyst (Reitz et al., *J. Am. Chem. Soc.* 1998, 120, 11467-11478) for converting hydrocarbons completely into carbon dioxide and water. In addition, it is potentially a useful component in the fabrication of sensors, magnetic storage media, field emitters, lithium-copper oxide electrochemical cells, cathode materials, and high $T_c$-superconductors (Lanza et al., *J. Mater. Res.* 1990, 5, 1739-1744; Podhajecky et al., *Electrochim. Acta* 1990, 35, 245-249). CuO nanowires can, for instance, be synthesized merely by heating Cu substrates in air from 400 to 700° C. (Jiang et al., *Nano Lett.* 2002, 2, 1333-1338; Cheng et al., *Nanotechnology* 2007, 18, 245604-1-245604-5), while 1D CuO nanostructures can be obtained by a high-temperature transformation of their 1D copper hydroxide nanoscale analogues (Cao et al., *Chem. Commun.* 2003, 1884-1885; Wen et al., *Langmuir* 2005, 21, 4729-4737; Du et al., *Chem. Phys. Lett.* 2004, 393, 64-69; Lu et al., *J. Phys. Chem B* 2004, 108, 17825-17831; Zhang et al., *J. Cryst Growth* 2006, 291, 479-484). Polycrystalline CuO nanofibers have been prepared through electrospinning (Wu et al., *Appl. Phys. Lett.* 2006, 89, 133125-1-133125-3). Free standing CuO nanotube and nanowire arrays have been fabricated by depositing precursors of either a MOCVD process (Malandrino et al., *Chem. Mater.* 2004, 16, 5559-5561) or a sol-gel technique (Yi-Kun et al., *Trans. Nonferrous Met. SOC. China* 2007, 17, 783-786) into the uniform pores of alumina templates, followed by subsequent annealing.

Because of its high stability, relatively low cost, and n-type semiconducting properties with a small bandgap (2.1 eV), α-Fe$_2$O$_3$ has been associated with applications ranging from gas sensing, lithium-ion battery production, catalysis, water splitting, water purification, and solar energy conversion to pigmentation (Chen et al., *Adv. Mater.* 2005, 17, 582-586; Gondal et al., *Chem. Phys. Lett.* 2004, 385, 111-115; Ohmori et al., *Phys. Chem. Phys.* 2000, 2, 3519-3522). Nanobelts, nanowires, and arrays of hematite structures have been synthesized by different methods, such as (a) the direct thermal oxidation of a pure iron substrate in an oxidizing atmosphere with a temperature range of 500-800° C. (Fu et al., *Chem. Chem. Phys. Lett.* 2003, 379, 373-379; Wen et al., *J. Phys. Chem. B* 2005, 109, 215-220); (b) the vacuum pyrolysis of β-FeOOH nanowires in a pressure range of $10^{-2}$ to $10^{-3}$ atm (Wang et al., *J. Mater. Chem.* 2004, 14, 905-907; Xiong et al., *Inorg. Chem.* 2004, 43, 6540-6542); and (c) PLD using pressed Fe$_3$O$_4$ powder as a target (Morber et al., *J. Phys. Chem. B* 2006, 110, 21672-21679). Hematite nanotubes (Chen et al., *Adv. Mater.* 2005, 17, 582-586) and their corresponding arrays (Shen et al., *Chem. Lett.* 2004, 33, 1128-1129) have also been obtained by decomposing organometallic iron precursors, embedded within the pores of an alumina template, at high temperature. Moreover, hematite nanotubes have been synthesized by using carbon nanotubes as a structural template motif (Sun et al., *Adv. Mater.* 2005, 17, 2993-2997).

It would be desirable to develop a protocol that allows for an environmentally sound and cost-effective methodology of metal oxide nanoscale synthesis without the need to sacrifice on sample quality, crystallinity, monodispersity, and purity. For example, it would be an advance to develop a generalizable protocol aimed at ZnO, CuO, and α-Fe$_2$O$_3$ (hematite) nanowire/array formation while overcoming the high temperatures, the need for expensive equipment, the use of potentially toxic precursors and byproducts, or the ultimate product polycrystallinity, characteristic of previous methods of metal oxide nanoscale synthesis.

SUMMARY OF THE INVENTION

Figure 1:
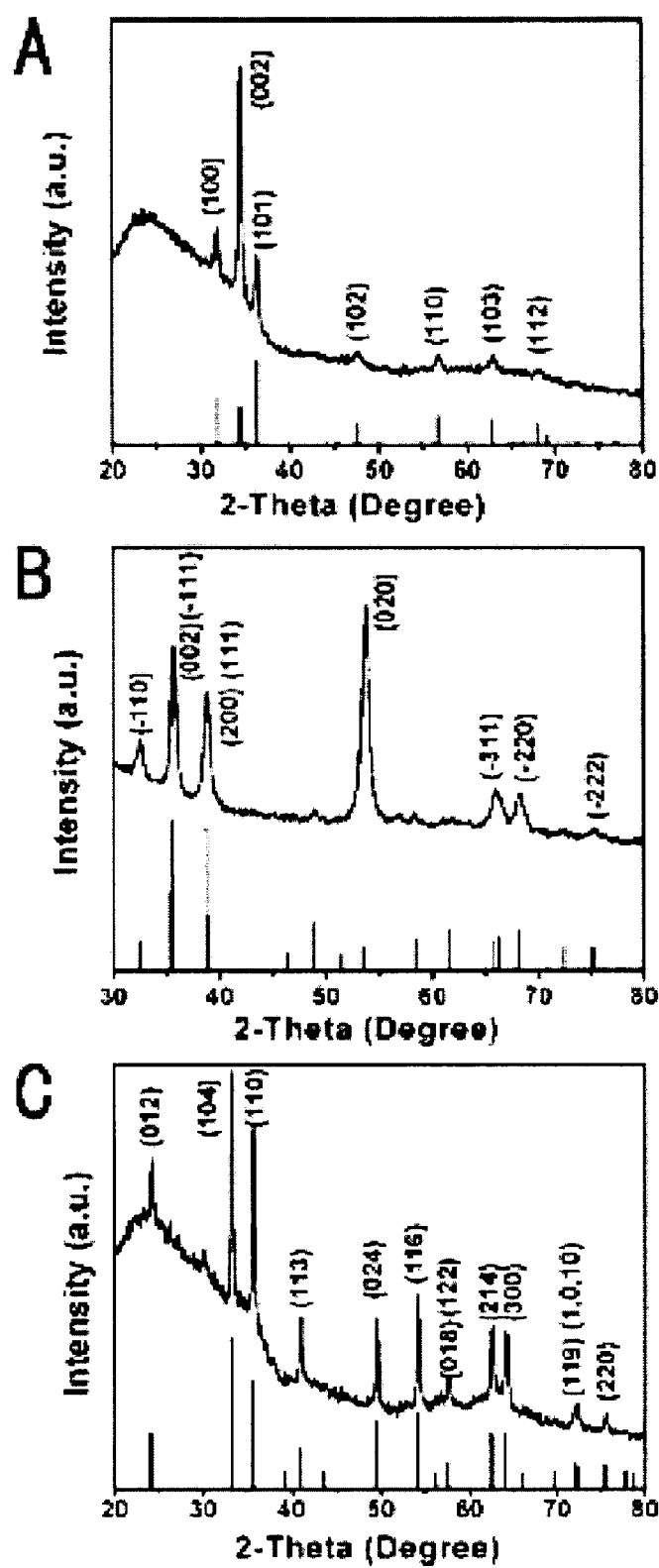
FIG. 1. XRD patterns of as-prepared samples: (A) ZnO nanowires, (B) CuO nanowires, and (C) α-Fe$_2$O$_3$ nanotubes. Representative diffraction patterns (upper half) and corresponding standard JCPDS diffraction patterns (lower half) for each of the samples are shown in each figure part.

The present invention includes a template-directed synthesis by which to prepare size controlled, one-dimensional nanostructures under ambient conditions in aqueous solution with reliable control over shape, dimensionality, and crystallinity. A room-temperature preparation of single-crystalline BaWO$_4$ and BaCrO$_4$ nanowires with different controllable sizes, as well as the creation of arrays of these nanowires, in the pores of an alumina membrane were previously demonstrated (Mao et al., *J. Am. Chem. Soc.* 2004, 126, 15245-15252). Also, such methodology was used in the production of BaF$_2$, CaF$_2$, and SrF$_2$, in addition to NH$_4$MnF$_3$ and KMnF$_3$ nanowire structures (Mao et al., *Adv. Mater.* 2006, 18, 1895-1899).

In the present method, conventional, commercially available membranes are mounted between the two halves of a glass U-tube cell (Martin, et al., *J. Am. Chem. Soc.* 1990, 112, 8976-8977; Liang et al., *Chem. Mater.* 1991, 3, 390-391). The half-cells are then filled with solutions of precursor solutions. In effect, the pores in the membranes are used as the environment with which to confine and control the growth of one-dimensional products. Moreover, these as-produced nanomaterials are chemically pure, are structurally well-defined, and can be generated in reasonable quantities.

In one aspect of the invention, a method of producing a crystalline metal oxide nanostructure is provided. The method comprises providing a metal salt solution and providing a basic solution; placing a porous membrane between the metal salt solution and the basic solution, wherein metal cations of the metal salt solution and hydroxide ions of the basic solution react, thereby producing a crystalline metal oxide nanostructure, wherein the metal salt in the metal salt solution is selected from the group consisting of zinc salt, copper salt, iron salt, cobalt salt, nickel salt, magnesium salt, manganese salt, scandium salt, thallium salt, tin salt, aluminum salt, cadmium salt, and chromium salt. Examples of other salts include yttrium salt, zirconium salt, vanadium salt, ruthenium salt, tungsten salt, bismuth salt, barium salt, calcium salt, strontium salt, osmium salt, gallium salt, germanium salt, antimony salt, niobium salt, rhenium salt, lead salt. In one embodiment, the method comprises a double-diffusion set-up.

In one embodiment, the metal oxide nanostructure is single crystalline. In one embodiment, the metal oxide nanostructure is polycrystalline. In one embodiment, the metal salts are selected from the group consisting of zinc salt, copper salt and iron salt.

In one embodiment, the production takes place at about room temperature to about 600° C., or at about room temperature to about 700° C., or about 80° C. to about 500° C. In one embodiment, the production takes place at about 80° C. to about 90° C.

In one embodiment, the metal cations and hydroxide ions predominantly nucleate to form metal hydroxides within the confines of the pores. In this embodiment, the porous membrane can be a polycarbonate membrane. In one embodiment, the metal cations and hydroxide ions predominantly nucleate at the walls of the pores. In this embodiment, the porous membrane can be an alumina membrane.

In one embodiment, the basic solution has a pH of about 8 to about 13. In one embodiment, the basic solution has a pH of about 10 to about 13.

In one embodiment, the basic solution has a pH of greater than or equal to 13, the membrane is a polycarbonate membrane, and zinc oxide nanowires are produced.

In one embodiment, the basic solution has a pH of greater than or equal to 13, the membrane is a polycarbonate membrane, and copper oxide nanowires are produced.

In one embodiment, the basic solution has a pH of greater than or equal to 13, the membrane is an alumina membrane, and hematite nanotubes are produced.

In one embodiment, the method further comprises controlling the dimensions and morphology of the nanostructures, wherein homogeneous type membrane encourages formation of nanowires or nanorods; wherein heterogeneous type membrane encourages formation of nanotubes; wherein as the pH of the basic solution increases, the length of one-dimensional nanostructures increases; wherein as the temperature of the reaction increases, the length of one-dimensional nanostructures increases; wherein the reaction can proceed until nanowires form when using homogeneous type membrane. In this specification, "encourages formation of" includes "yields predominantly."

In one aspect of the invention, a crystalline metal oxide nanostructure having the formula $M_xO_y$ is provided. Preferably, x is 1, 2, 3, 4 or 5, and y is 2, 3, 4, 7 or 8. For example, x can be 1 or 2, and y can be 1 or 3. Examples of M include Zn, Cu, Fe, Co, Ni, Mg, Mn, Sc, Tl, Sn, Al, Cd, and Cr. Further suitable examples of M include Y, Zr, V, Ru, W, Bi, Ba, Ca, Sr, Os, Ga, Ge, Sb, Nb, Re, and Pb. Preferably, the nanostructure has a high degree of purity. The nanostructure can be, for example, a nanotube, a nanowire or nanorod. In one embodiment, the metal oxide nanostructure is single crystalline. In one embodiment, the metal oxide nanostructure is polycrystalline.

In one aspect of the invention, a nanoarray comprising a plurality of crystalline metal oxide nanostructures wherein the chemical formula of the nanostructures is $M_xO_y$ is provided. Preferably, x is 1, 2, 3, 4 or 5, and y is 2, 3, 4, 7 or 8. For example, x can be 1 or 2, and y can be 1 or 3. Examples of M include Zn, Cu, Fe, Co, Ni, Mg, Mn, Sc, Tl, Sn, Al, Cd, and Cr. Further suitable examples of M include Y, Zr, V, Ru, W, Bi, Ba, Ca, Sr, Os, Ga, Ge, Sb, Nb, Re and Pb. Preferably, the nanostructures have a high degree of purity. The nanoarray can comprise nanowires, nanotubes, or mixtures thereof. In one embodiment, the nanaoarray can comprise nanostructures which are single crystalline, polycrystalline, or mixtures of both. For example, the nanoarray can be at least 50% monodisperse.

In one aspect of the present invention, a device comprising at least one crystalline nanostructure, as described above, is provided. Examples of a device include sensors, a device used in molecular electronics, a device used in optoelectronics, and scanning probe microscopy tips.

In one aspect of the present invention, a crystalline metal oxide nanostructure produced by the following method is provided. The method comprises providing a metal salt solution and providing a basic solution; placing a porous membrane between the metal salt solution and the basic solution, wherein metal cations of the metal salt solution and hydroxide ions of the basic solution react, thereby producing a crystalline metal oxide nanostructure. Examples of the metal salt in the metal salt solution include zinc salt, copper salt, iron salt, cobalt salt, nickel salt, magnesium salt, manganese salt, scandium salt, thallium salt, tin salt, aluminum salt, cadmium salt, yttrium salt, zirconium salt, vanadium salt, ruthenium salt, tungsten salt, bismuth salt, barium salt, calcium salt, strontium salt, osmium salt, gallium salt, germanium salt, antimony salt, niobium salt, rhenium salt, lead salt, and chromium salt.

The present invention overcomes shortcomings of the prior art. For example, the method is generalizable and can be adapted to the production of binary metal oxides. Some of the key attractive attributes of the methodology of the present invention are (1) use of relatively low temperature (i.e., room temperature to about 80° C.); (2) short reaction time (about 30 min); (3) simplistic, inexpensive experimental setup, requiring the use of a homemade U-tube; (4) lack of either a toxic organic precursor or a toxic byproduct (i.e., only an inorganic metal salt solution along with sodium hydroxide was utilized in the synthesis); (5) relative ease of template removal by immersion in, for example, methylene chloride; (6) no need for either metal oxide or metal nanocrystalline "nucleation seeds"; and (7) substrate-less generation of metal oxide nanostructure arrays.

Examples of toxic precursors that are avoided by the methods of the invention include organic solvents and surfactant, (e.g., hexamethylenetetramine, acetylacetone). Examples of byproducts that are avoided by the present invention include carbon dioxide and nitrogen dioxide.

The metal oxide arrays can be transferred onto any type of substrate, be it curved, linear, rigid or pliant, upon template attachment to a conductive tape and subsequent template removal. Such highly flexible array generation has relevance for applications as diverse as usage in portable electronics, implantable biosensors, biodetectors, and self-powered electronic devices (Gao et al., Adv. Mater., 2007, 19, 67-72).

Moreover, the generation of high-quality, high aspect ratio, and high surface area binary metal oxide nanostructures, as well as their corresponding assembly into functional arrays, can improve the luminescence efficiency of electro-optic devices and the sensitivity of chemical sensors. Furthermore, the invention enables the making of nanostructures with predictable size and morphology.

DETAILED DESCRIPTION OF THE PRESENT INVENTION

The present invention relates to the field of nanotechnology, including nanostructures and their applications.

Crystalline Nanostructures

The present invention includes binary metal oxide crystalline nanostructures. These nanostructures include free-standing one dimensional nanostructures, and include nanoarrays comprising a plurality of such nanostructures. The invention also includes methods of making such nanostructures. In particlar, the methods enable the making of nanostructures with predictable size and morphology.

In one embodiment of the present invention, the nanostructures have the chemical formula of $M_xO_y$, wherein "x" can be 1, 2, 3, 4 or 5 and "y" can be 1, 2, 3, 4, 7 or 8; more typically, wherein "x" is 1 or 2, and "y" is 1 or 3.

Preferably, the metallic elements of the nanostructures of the invention are zinc, copper, iron, aluminum, cadmium, cobalt, chromium, magnesium, manganese, nickel, scandium, tin, or thallium. Examples of some metal oxides of the invention include $ZnO$, $CuO$, $Cu_2O$, hematite, $Fe_2O_3$, $FeO$, $Fe_3O_4$, $Al_2O_3$, $CdO$, $CoO$, $Co_2O_3$, $Co_3O_4$, $CrO$, $Cr_2O_3$, $CrO_2$, $CrO_3$, $MgO$, $MnO$, $Mn_3O_4$, $Mn_5O_8$, $Mn_2O_3$, $MnO_2$, $MnO_3$, $Mn_2O_7$, $NiO$, $Ni_2O_3$, $Sc_2O_3$, $SnO$, $SnO_2$, $Tl_2O$, $TlO_2$, $Tl_4O_3$ and $Tl_2O_3$.

Additional examples of metallic elements of the nanostructures of the invention are yttrium, zirconium, vanadium, ruthenium, tungsten, bismuth, barium, calcium, strontium, osmium, gallium, germanium, antimony, niobium, rhenium, and lead.

The nanostructures of the invention are single crystalline or polycrystalline. Typically, the nanostructures are at least 80% free, preferably at least 95% free, more preferably at least 99% free, and most preferably virtually completely free of defects and/or dislocations. As defined in this specification, defects are irregularities in the crystal lattice (i.e., intrinsic defects). Some examples of defects include a non-alignment of crystallites, an orientational disorder (e.g., of molecules or ions), vacant sites with the migrated atom at the surface (Schottky defect), vacant sites with an interstitial atom (Frenkel defects), point defects, grain boundary defects, and non-stoichiometry of the crystal. An example of a dislocation is a line defect in a crystal lattice.

Additionally, the nanostructures are preferably at least 95% free, more preferably at least 99% free, and most preferably virtually completely free of amorphous materials and/or impurities. Examples of amorphous materials include organic surfactant molecular groups, such as bis(2-ethylhexyl)sulphosuccinate, undecylic acid, sodium dodecyl sulfate (SDS), Triton X-100, decylamine, or double-hydrophilic block copolymers, which are present on the surfaces of prior art nanostructures. Examples of impurities include an element different from the elements of the crystalline structure and a vacancy.

The nanostructures of the invention include one-dimensional nanostructures, such as nanotubes, nanowires and nanorods. Nanotubes are hollow with varying wall thicknesses. Nanowires and nanorods are solid. Nanowires and nanorods differ in aspect ratios (i.e., diameter/length). An aspect ratio of greater than 5 is known as a nanowire. Nanorods typically have an aspect ratio of about 3 to about 5. The diameter of the one-dimensional nanostructure typically ranges from about 1 to about 10,000 nm, more typically from about 2 nm to about 2 µm. The length of the nanostructure typically ranges from about 20 nm to about 20 µm, more typically about 10 µm.

The present invention includes a nanoarray comprising a plurality of crystalline one-dimensional nanostructures of the invention. Preferably, a nanoarray is at least 50%, 60%, 70%, 80%, 90%, 95%, 99% or virtually completely monodisperse.

The nanoparticles of the present invention range from about 14 nm to greater than about 100 nm. Nanoparticles are generally spherical in shape.

Methods of Making Nanostructures

In the methods of making nanostructures, any compound containing a metal can be used as a reagent. Preferably, metal salts are used as reagents. The metal salt is placed in an aqueous solution to form a metal reagent solution, i.e., a metal salt solution.

Some examples of reagents include:

Al (aluminum): acetate $(CH_3CO_2)_2AlOH$, ammonium sulfate $AlNH_4(SO_4)_2$, bromide, chloride, hydroxide, isopropoxide $Al[(CH_3)_2CHO]_3$, lactate $Al[CH_3CH(OH)CO_2]_3$, nitrate, oxide, perchlorate $Al(ClO_4)_3$, phosphate $AlPO_4$, sulfate $Al_2(SO_4)_3$, etc.

Cd (cadmium): acetate $(CH_3CO_2)_2Cd$, bromide, carbonate $CdCO_3$, chloride $CdCl_2$, fluoride, hydroxide, iodide, nitrate $Cd(NO_3)_2$, oxide $CdO$, perchlorate $Cd(ClO_4)_2$, sulfate, alkylcadmium, etc.

Co (cobalt): acetate $(CH_3CO_2)_2Co$, bromide, carbonate, chloride, fluoride, hydroxide, iodide, nitrate, oxalate, oxide, perchlorate, sulfate, etc.

Cr (chromium): acetate hydroxide $(CH_3CO_2)_7Cr_3(OH)_2$, bromide, chloride ($CrCl_2$, $CrCl_3$), fluoride, nitrate, oxide ($Cr_2O_3$), perchlorate, phosphate, sulfate, etc.

Cu (copper): acetate $(CH_3CO_2)_2Cu$, bromide, carbonate, chloride, fluoride, hydroxide, iodide, nitrate, oxide, perchlorate, sulfate, etc.

Fe (iron): acetate, bromide, chloride, citrate, fluoride, iodide, nitrate, oxalate, oxide, perchlorate, phosphate, sulfate, goethite, magnetite, acetylacetonate; sulfite; pentacarbonyl; hexacarbonyl; etc.

Mg (magnesium): acetate, bromide, carbonate, chloride, hydroxide, iodide, nitrate, oxide, sulfate, etc.

Mn (manganese): acetate $(CH_3CO_2)_2Mn/(CH_3CO_2)_3Mn$, bromide, carbonate, chloride, fluoride, iodide, nitrate, oxide, perchlorate, sulfate, etc.

Ni (nickel): acetate, bromide, carbonate, chloride, fluoride, hydroxide, iodide, nitrate, oxalate, oxide, perchlorate, sulfate, etc.

Sc (scandium): bromide, chloride, fluoride, iodide, nitrate, oxalate, etc.

Sn (tin): bromide, chloride, fluoride, iodide, etc.

Tl (thallium): bromide, chloride, fluoride, iodide, nitrate, oxalate, perchlorate, sulfate, carbonate, etc.

Zn (zinc): acetate $(CH_3CO_2)_2Zn$, bromide, chloride, fluoride, iodide, lactate $[CH_3CH(OH)CO_2]_2Zn$, nitrate, oxalate, oxide, perchlorate, peroxide, sulfate, etc.

Examples of other metal salts that can be used as reagents in the invention are yttrium salts, zirconium salts, vanadium salts, ruthenium salts, tungsten salts, bismuth salts, barium salts, calcium salts, strontium salts, osmium salts, gallium salts, germanium salts, antimony salts, niobium salts, rhenium salts, and lead salts.

The methods can further comprise doping of the nanostructures with perovskites. In such embodiment, doping compounds are added to the metal salt solutions.

A reagent basic solution is also provided. The basic solution can be any aqueous basic solution which would provide the desired nanostructures. Examples of basic reagent solutions include solutions of sodium hydroxide (NaOH), ammonium hydroxide ($NH_3 \cdot H_2O$), potassium hydroxide (KOH), barium hydroxide ($Ba(OH)_2$), cesium hydroxide (CsOH), strontium hydroxide ($Sr(OH)_2$), calcium hydroxide ($Ca(OH)_2$), lithium hydroxide (LiOH), rubidium hydroxide (RbOH) and magnesium hydroxide ($Mg(OH)_2$). Typically, the pH of the basic solution can be about 9 to about 14, about 10 to about 13, about 8 to about 13, more typically from about 12 to about 13.

The metal salt solution and the basic solution are placed in contact with each other in a manner which allows production of single crystals of insoluble metal hydroxides. In particular, the reagent solutions are placed into contact with each other at a slow rate. Preferably, the reagent solutions are placed into two reservoirs separated from each other by a template membrane.

The relative concentrations of the two selected reagent solutions can be any relative amount which provides the desired nanostructures. For example, the relative concentrations of the two selected reagent solutions can range from being equivalent (i.e., equimolar) to where one solution is about twice or about thrice as concentrated as the other.

A metal salt solution is paired with an appropriate basic solution to form the desired product as would be known to a skilled artisan. For example, sodium hydroxide can be paired with a zinc salt or a copper salt solution to form the respective oxides; and ammonium hydroxide can be paired with an iron salt to form hematite.

An example of a set-up which allows for a slow rate of contact of reagent solutions is a double-diffusion set-up. The contents of each solution in either half of a U-tube are allowed to diffuse toward each other across a wetted template membrane physically separating the two halves. (See, for example, Figure S1 in the Supporting Information described below.) A double diffusion crystallization set-up process is described in Park et al., *Adv. Mater.*, 2002, 14, 1167; Park et al., *J. Mater. Chem.*, 2004, 14, 2291; and Peters et al., M., *J. Chem. Soc., Dalton Trans.*, 2001, 24, 358, all of which is incorporated herein by reference.

The reagent solutions flow into the membrane pores. The membrane slows down the rate of contact of the ions of the reagents. When metal cations and hydroxide anions meet at the interface, they react in a hydrolysis process, and nucleate the formation of the corresponding insoluble hydroxides. Nucleation is the onset of a phase transition in a small region of a solution. Once the supersaturation value for production of the insoluble hydroxide has been exceeded, it begins to precipitate from solution. For example, the supersaturation values for zinc hydroxide, copper hydroxide and iron hydroxide are rather low based on the magnitudes of the solubility product constants of these materials. (See Table S1 in the Supporting Information described below.)

The initially-formed metal hydroxides are then transformed via a low temperature "dehydration" and subsequent crystallization process to ultimately yield their corresponding metal oxides upon low-temperature heating. The duration of heating at a certain temperature is performed until a desired product is produced. Some examples of the temperature of heating is from about room temperature to about 600° C.; from about room temperature to about 700° C.; from about room temperature to about 90° C.; from about 80° C. to about 500° C.; from about 80° C. to about 90° C. Some examples of the duration of heating is from about fifteen minutes to about 3 hrs; and from about 30 minutes to about 90 minutes.

In some embodiments, a step of high temperature annealing is added to obtain the desired product. For example, annealing temperature can be about 500° C. to about 700° C.

In one embodiment, free-standing nanostructures are provided. An initial nanoscale oxide nanostructure is formed inside a template membrane, as described above, followed by membrane removal. Membranes can be removed from the resultant nanostructures by immersion in a base solution or an organic solvent dependent upon the particular membrane, as would be known by a skilled artisan. For example, the membranes can be removed by immersion in NaOH solution or methylene chloride at room temperature. Thereafter, to retrieve free-standing nanostructures, the base solution is diluted in several steps with distilled water and an organic solvent. Free-standing nanostructures are then collected by centrifugation or filtration, as would be known by a skilled artisan.

In another embodiment, arrays comprising a plurality of one-dimensional nanostructures are provided. In this embodiment, membranes were initially attached to a piece of either double-sided conductive tape (e.g., carbon tape or copper tape) before formation of the metal oxides. Membranes are removed as described above. After washing steps with distilled water followed by air-drying, the arrays are mounted onto a variety of substrates.

The present method of forming arrays is a generalizable protocol that can be performed under ambient conditions for essentially any type of material. This method allows for the transference of any type of metal oxide array motif onto a nonspecific substrate of any geometric configuration (i.e., nonlinear or otherwise) over a reasonably large macroscopic area. Moreover, these methods are effectively independent of the mechanical deformability, melting behavior, and/or decomposition temperature of the substrate onto to which the arrays are transferred, and furthermore, it does not necessitate the use of catalytic seed particles. All these factors are important in conventional methods traditionally associated with array patterning. In some embodiments, chemically distinctive types of metal oxide arrays can be attached in spatially adjacent positions.

Controlling the Morphology of the Nanostructures

The morphology of the resulting nanostructures can be predictably controlled by varying one or more different parameters of the methods of the invention.

For example, the dimensions and morphology of the resultant nanostructures are controlled by the structure of the template membranes within which the nanostructures are grown. The membranes act to spatially direct crystal growth.

The pore sizes of the template membranes are varied according to the desired dimensions and characteristics of the resultant nanostructures. For example, pore sizes can range from about 3 nm to about 1000 nm, preferably from 20 nm to several hundred nanometers. As the pore size increases to a certain maximum level, one-dimensional nanostructures become straighter and smoother with fewer extraneous particulate debris. The resultant nanostructures typically have diameters which are approximately 20 to 80% larger than the reported pore size of the membrane. For example, using a membrane with about 200 nm diameter pores produces nanotubes and nanorods having outer diameters in the range of about 240 to about 300 nm. The lengths of the nanotubes and nanowires/nanorods range from several microns to the entire length of the template membranes.

The template membranes can have varying pore densities. For example, a membrane can have one single pore to about $10^9$ pores/cm$^2$ or to about $10^{11}$ pores/cm$^2$. A membrane can have pores of uniform size or can have pores of varying sizes.

The thicknesses of the membranes are varied according to the desired lengths of the nanostructures. The maximum length of a nanostructure is limited by the thickness of a membrane. Membranes typically range from approximately about 20 nm to about 20 μm, more typically from about one to about fifteen microns, in thickness.

The width of an array corresponds with the width of the membrane on which the array was grown. The length of an array corresponds with the thickness of the membrane. The nanostructures of an array can be monodisperse by using a membrane with uniform pores. Alternatively, the nanostructures of an array can be polydisperse by using a membrane with a variety of different pore sizes.

Additionally, the distances between each individual nanostructure within an array is controlled by varying the pore densities on the membranes. All other parameters being equal, the more dense the porosity of a membrane, the closer each individual nanostructure is to each other. Alternatively, the pores on the membrane can be placed in such a fashion that they are not at a uniform distance from each other.

Although, within a nanoarray, the one-dimensional nanostructures are individually separated from each other, they form a dense, continuous network. Preferably, the nanostructures are roughly parallel to each other and vertically oriented on the substrates to form a packed array, stretching over micron-sized areas.

The shapes of the nanostructures reflect the morphology and inner surface roughness of the pores within which they were grown. That is, the morphology of the nanostructures can spatially map out the interior nanoscopic profile and localized contours of the internal pores of the membranes.

For example, if the inner surface of a pore within which a nanostructure was grown is smooth, then the resultant nanorod is straight and smooth. Alternatively, if the inner surface of a pore is rough, then the resultant nanostructure has protrusions and/or depressions on its surface.

In one embodiment, the membranes used in the methods can be made from any suitable polymer. Preferred membranes include "track-etch" polymeric membranes. These commercially available membranes are usually prepared from either polycarbonate or polyester.

Polycarbonates are polymers having functional groups linked together by carbonate groups (—O—(C=O)—O—) in a long molecular chain. Polycarbonate membranes are produced by heavy ion irradiation of a polycarbonate material and then chemical etching of the latent ion tracks. See, for example, Yu et al., Journal of Membrane Science, 2006, 282, 393-400. By varying the etching conditions, different pore sizes of the polycarbonate membranes can be produced. Additionally, different pore geometries can be produced, for example, as circular and oval shapes In another embodiment, porous alumina membranes are used as template membranes. Alumina membranes have pores which are tunable in the range of 4 to several hundred nanometers. Pore densities as high as $10^{11}$ pores/cm$^2$ can be obtained, and typical membrane thicknesses can range from 10 to 100 µm. An example of an alumina membrane is porous anodic alumina (AAO) membrane.

The type of template membrane used strongly influences whether nanotubes or nanowires/nanorods are produced. For example, depending on the template membrane used, the nucleation of metal hydroxides can be in either a predominantly homogenous fashion or a predominantly heterogeneous fashion.

In a homogeneous nucleation, nucleation predominantly first occurs within the solution without attachment to a foreign body. Such nucleation tends to occur if the interactions between reagent molecules are stronger than those between the reagent molecules and the pore walls. In particular, the nucleation process and accompanying product formation happen within the voluminous confines of the pores themselves in a homogeneous-type process. That is, single crystals of nanoscale metal hydroxides derive from isolated, disparate nucleation sites, which then grow by extension throughout the porous network. In this specification, the confines of a pore are defined as anywhere inside a pore excluding the wall of the pore. Continued growth then occurs at the particle surface at a rate limited by ion availability, until the crystal impinges on the template surface itself, which ultimately limits further particle growth. Within the confines of the template pores, as-formed particles in this embodiment essentially self-assemble with each other into either wire-like or rod-like motifs.

In a heterogeneous nucleation, nucleation predominately first occurs by attachment to a foreign body; in this case, the foreign body is the pore wall. Such nucleation tends to occur if the interactions between the reagent molecules are weaker than those between the reagent molecules and the pore walls. The nucleation and accompanying growth processes may tend to be localized at the surfaces of the pore walls in a heterogeneous-type process.

Such a heterogeneous process occurs, for instance, if the pore wall is positively charged while the reagent particles are negatively charged. This preferential confinement of growth to the inherent geometry of the pore walls can therefore lead to the generation of primarily tube-like motifs upon the elongation and assembly of the as-formed particles. Such a process has been previously noted in the case of polymeric microtubules formed in templates, wherein nascent polymer chains initially adsorbed to the pore walls yielding a thin polymer "skin" that became thicker with time until it was quenched with water (Martin et al., J. Am. Chem. Soc. 1990, 112, 8976-8977).

With continued reaction, there is a lateral thickening of the tubular structure. At a certain point of the reaction, the further supply of precursors to the inside is blocked by the ever-growing tube thickness coupled with an ever-decreasing inner tube diameter. If the reaction is continued further, the entire porous interior of the template is filled completely. In other words, continued growth of the nanotubes is limited only by reagent ion availability and diffusivity as well as by intrinsic geometrical constraints imposed by the template channels. Hence, nanowires/nanorods are considered as the ultimate limit of nanotube growth in terms of its width. This nanotube-to-solid nanowire/nanorod transformative mechanism has been previously proposed with respect to the synthesis of $TiO_2$ nanotubes and nanowires within alumina (AAO) templates (Cochran et al., Acta Mater. 2007, 55, 3007-3014).

Figure 12:
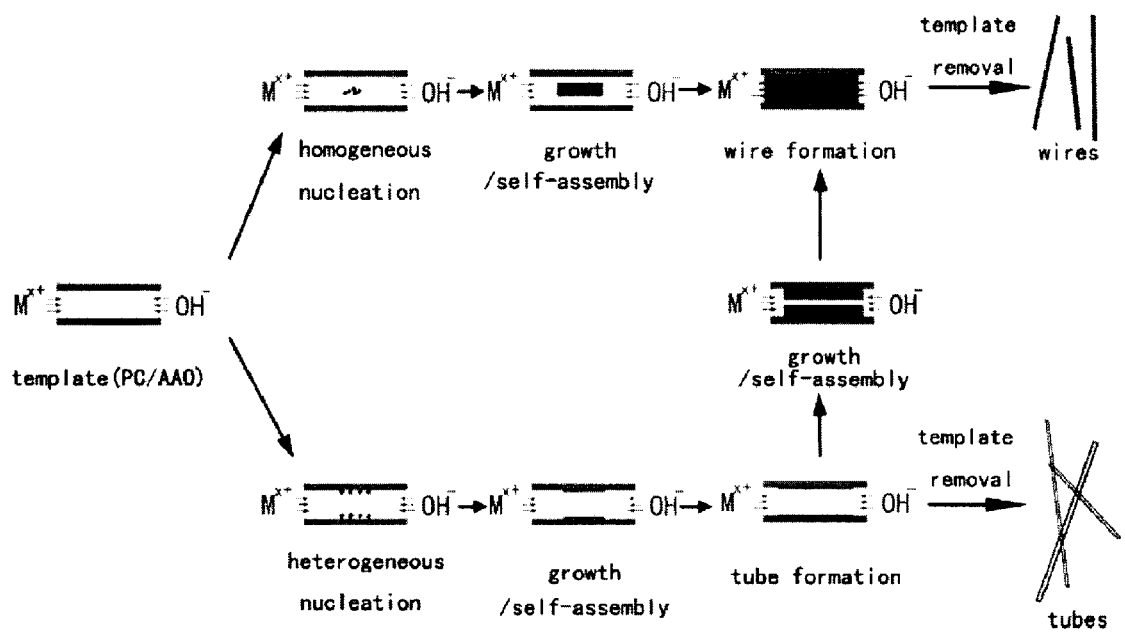
FIG. 12. Scheme 1. Postulated mechanism for synthesizing nanowires and nanotubes from template pores, based on plausible explanations using heterogeneous and homogeneous processes.

Although not wanting to be limited by a mechanism, a plausible scenario for the metal hydroxide nanostructure formation of both the homogeneous and heterogeneous nucleation is shown in Scheme 1 of FIG. 12.

Polycarbonate membranes typically encourage a homogeneous-type nucleation. For example, zinc oxide and copper oxide nanowires/nanorods are formed by use of polycarbonate membranes. Alumina membranes typically encourage a heterogeneous-type nucleation. For example, hematite nanotubes are formed by AAO membranes.

Additionally, membranes can be chemically modified to convert a homogenous-type membrane to a heterogeneous-type membrane, and visa-versa, by changing the polarity of the wall. In particular, if a pore wall having a certain polarity produces nanotubes, then transformation of a polar wall into a nonpolar wall, or transformation of a nonpolar wall into a polar wall, will produce nanowires/nanorods. A surfactant can be used to change the surface charge on the pore walls of a membrane. Additionally, the walls can be modified by a chemical reaction between introduced chemical ligands and existing functional groups on the walls (such as, for example, hydroxy groups).

Varying the conditions of the synthesis also affects the dimensions and characteristics of the resultant nanostructures. For example, as the duration of the synthesis increases, a greater portion of each pore is filled with the metal hydroxides. If the desired resultant nanostructures are nanotubes, then the duration of deposition is stopped before the metal hydroxides are allowed to fill the entire pore volume. The thickness of the walls of the nanotubes increases as the duration of deposition increases. If the desired resultant nanostructures are nanowires/nanorods, then the duration of deposition is allowed to proceed until the metal hydroxides fill the whole pore volume. The reagents are in contact until the desired growth is achieved, e.g., from about 30 minutes to about 100 hrs, more typically from about 1 hr to about 6 hrs.

Additionally, the pH concentration of the basic solution and synthesis temperature also govern the morphologies of the resulting nanotubes and nanowires/nanorods. Lower pH and lower temperatures favor the production of short, nanotubes. Higher pH (e.g., pH of 13 or about 13) and higher temperatures favor the growth of longer, thicker wires. (Examples of other high pH levels include a pH of about 8 to about 12.) In particular, a higher temperature accelerates ion diffusion rates across template membranes. A greater concentration of OH⁻ promotes particle nucleation as well as nanostructure elongation.

For example, during a homogeneous type formation process, a higher temperature and/or a higher base concentration promote high diffusion rates and correspondingly high local concentrations of interacting reagent ions. These conditions therefore lead to initial particle formation followed by subsequent aggregation, coalescence, and self-assembly of these constituent particles to yield solely solid nanostructures. Upon reduction of either base concentration or temperature, shorter solid nanostructures (a few micrometers in length versus tens of micrometers in length) are obtained and, in some cases, isolated particles are also generated in addition to the wire-like motifs. Simultaneous decreases in both temperature and base concentration typically yield only small, discrete particles, measuring tens of nanometers.

In embodiments in which heterogeneous processes predominate, even under the mildest of experimental conditions, for example at a low concentration of basic solution (e.g., a low concentration of pH 12 solution) and at room temperature, nanotubes can be synthesized. As the pH of the basic solution is increased (e.g., a pH of about 13), while the reaction temperature is held constant, the length of the nanotubes increase. However, it should be noted that the solubility product constants ($K_{sp}$ value) of the resultant hydroxides should be taken into account. For instance, smaller $K_{sp}$ values (~$10^{-40}$) are more conducive to metal hydroxide nanostructure formation. If a $K_{sp}$ value is too high, product will typically not form.

EXAMPLES

The following examples demonstrate the successful synthesis of ZnO nanowires, CuO nanowires, and α-$Fe_2O_3$ nanotubes, as well as their corresponding arrays, via a low cost, generalizable, and simplistic template method. Diameters of one-dimensional (1-D) metal oxide nanostructures (~60-260 nm), measuring micrometers in length, can be reliably and reproducibly controlled by the template pore channel dimensions. Associated vertically aligned arrays have been attached to the surfaces of a number of geometrically significant substrates, such as curved plastic and glass rod motifs. The methodology reported relies on the initial formation of an insoluble metal hydroxide precursor, initially resulting from the reaction of the corresponding metal solution and sodium hydroxide, and its subsequent transformation under mild conditions into the desired metal oxide nanostructures. Size- and shape-dependent optical, magnetic, and catalytic properties of as-prepared 1-D metal oxides were investigated and noted to be mainly comparable to, or better than, the associated properties of the corresponding bulk oxides.

The following Examples demonstrate that the concentration of the reagent solutions and temperature govern the morphologies of the resulting nanotubes and nanowires/nanorods. Lower concentrations and temperatures favor the production of short, thinner nanotubes. Higher concentrations and temperatures favor the growth of longer, thicker wires.

In support of this mechanism, a systematic series of experiments were performed (Table 1) to probe the effect of parameters such as (a) temperature and (b) concentration on the resulting nanostructure morphology. Chemically pure, crystalline nanoscale ZnO and CuO samples (e.g., samples A and B from Table 1) upon template removal were obtained only when the U-tube experimental setup itself was heated to 80° C. It is plausible to assume that a higher temperature accelerates ion diffusion rates across the template. Hence, U-tube experiments were run at room temperature as a comparison. In terms of the concentration parameter, the concentration of OH⁻, necessary to induce precipitation, was varied in the experiments from 0.01 to 0.1 M with higher concentrations (and therefore fluxes) of hydroxide ion expected to foster particle nucleation as well as nanostructure elongation. It should be noted though that the effect of changing this variable is slightly more nuanced as local, dynamic concentrations of hydroxide within the template environment are dependent on diffusion rates as well.

According to the mechanistic prediction, a higher temperature and/or a higher base concentration should promote high diffusion rates and correspondingly high local concentrations of interacting reagent ions. These conditions should therefore lead to initial particle formation followed by subsequent aggregation, coalescence, and self-assembly of these constituent particles to yield either nanowires or nanotubes. This prediction was borne out by the production of sample C, created at the highest temperature and base concentration used, wherein the ZnO and CuO generated consisted solely of nanowires. Conversely, upon reduction of either base concentration (sample D) or temperature (sample E), shorter nanowires (a few micrometers in length versus tens of micrometers in length for sample C) were obtained and in some cases, isolated particles were also generated in addition to the wire-like motifs. Simultaneous decreases in both temperature and base concentration yielded only small, discrete particles of likely either $Zn(OH)_2$ or $Cu(OH)_2$, measuring tens of nanometers (sample F and G), irrespective of the template used (e.g., PC or alumina), suggesting that for these two materials in particular, the nucleation and growth processes were essentially homogeneous in nature.

The case of iron oxide nanostructure formation in the presence of an alumina template is clearly different as heterogeneous processes likely predominate. That is, the reagent particle-pore wall interaction was comparatively strong and nucleated particles assembled primarily into tubular motifs. For instance, even under the mildest of experimental conditions, for example at very low concentrations of ammonium hydroxide (0.01 M) and at room temperature, 1D iron-containing nanotubes (likely $Fe(OH)_3$) were synthesized, as shown in sample H. The fact that under similar conditions, 1D nanostructures of either zinc hydroxide or copper hydroxide could not be generated suggests that the significantly smaller $K_{sp}$ value (~$10^{-40}$; Table S1) of $Fe(OH)_3$, as compared with the relatively higher $K_{sp}$ values (~$10^{-20}$; Table S1) for Cu(OH)$_2$ and Zn(OH)$_2$, was highly conducive to iron hydroxide nanostructure formation. Increasing the concentration of ammonium hydroxide to 0.1 M while maintaining the reaction temperature constant (sample I) led to the generation of longer Fe(OH)$_3$ nanotubes, which might have arisen owing to higher local concentrations of re-active reagent ions, which is again consistent with the predicted mechanism; in fact, it was only with an additional annealing step to 600° C. that one could successfully synthesize hematite nanotubes (sample J). By contrast, increasing both the reaction temperature (to 80° C.) and hydroxide concentration (to 0.1 M) as well as reverting to a PC template (sample K) resulted in the formation of iron-containing, nonhematite nanowires, described below in the XRD data discussion. The presence of the filled nanowire structures within the PC template reflected the more favorable reagent particle-particle vis-à-vis particle-pore wall interaction in this pore environment. Hence, iron oxide nanowire growth in PC templates is analogous to the homogeneous processes described for Zn and Cu. Such an assertion was further confirmed by the formation of sample L, prepared under low-temperature and low concentration conditions. As with sample F by analogy, only small, discrete particles, measuring about 100 nm in diameter and likely consisting of either amorphous hematite or more likely, iron hydroxide, were obtained.

Experimental Section

Synthesis. Commercially available polycarbonate (PC) membranes (Millipore Co.) used in this study contained pore sizes of 50, 100, and 200 nm in diameter, respectively. These polycarbonate filters possess track-etched channels with pores randomly distributed across the filter membranes. Commercially available alumina (AAO) templates (Whatman Co., U.K.) used in this study maintained pore sizes of 200 nm in diameter.

To synthesize ZnO and CuO nanowires, a typical PC membrane was mounted between the two halves of a U-tube cell. The half-cells were then filled with equimolar solutions (0.1 M) of metal salt solutions (e.g., ZnCl$_2$ (Aldrich) for ZnO and Cu(NO$_3$)$_2$ (Alfa Aesar) for CuO, respectively) and NaOH (Fisher) in water, respectively. The entire U-tube cell was subsequently placed in a water bath whose temperature was set at 80° C. It has been previously shown (Wen et al., *Langmuir* 2005, 21, 4729-4737; Du et al., *Chem. Phys. Lett.* 2004, 393-64-69; Uekawa et al., *Mater. Lett.* 2007, 61, 1729-1734; Ullah et al., *J. Mater. Sci.* 2006, 41, 3263-3269) that under these experimental conditions, metal hydroxides (such as Zn(OH)$_2$ and Cu(OH)$_2$, in this example) initially form and then transform via a low temperature "dehydration" and subsequent crystallization process to ultimately yield their corresponding metal oxides (such as ZnO and CuO, in this case) upon low-temperature heating of the alkaline solution containing these species. The results for CuO, in particular, visually confirmed this scenario as a change was observed from the blue hue characteristic of Cu(OH)$_2$, initially generated at room temperature, to the coal black color associated with the CuO product in solution, upon heating to 80° C. After 30 min of reaction, the PC template was detached, thoroughly washed by distilled water, and ultimately removed by immersion in methylene chloride for 10 min. Isolated nanoscale metal oxide samples were then centrifuged, washed with ethanol and distilled water, and finally oven-dried at 80° C. for 24 h.

To synthesize α-Fe$_2$O$_3$ nanotubes, an AAO membrane was mounted, as opposed to a PC template, between the two halves of a U-tube cell. The half-cells were then filled with equimolar solutions (0.01 M) of Fe$_2$(SO$_4$)$_3$ (J. T. Baker) and ammonium hydroxide (Fisher) in water. The U-tube cell was maintained at room temperature. After 1 h of reaction to prepare Fe(OH)$_3$ (Nashaat et al., *Langmuir* 2007, 23, 13093-13103), the AAO template containing the product was detached, thoroughly washed with distilled water, and oven-dried at 80° C. for 1 h. The AAO template was subsequently annealed at 600° C. for 60 min. to ultimately generate α-Fe$_2$O$_3$ nanostructures. Crystalline hematite could not be synthesized, despite numerous experimental variations, without an annealing step. After annealing, the template was removed by immersion in 1 M NaOH for 1 h. Samples were then centrifuged, washed with distilled water until the pH of the solution attained a value of 7, and ultimately oven-dried at 80° C. for 24 h.

It should be noted that, whereas in every case for ZnO, CuO, and α-Fe$_2$O$_3$ nanostructures, essentially 100% pure samples were generated in all of the runs, the process of optimizing overall yields of <50% is being continued.

Characterization. X-ray Diffraction (XRD). Crystallographic information on as-prepared samples was obtained using powder XRD through the mediation of a Scintag diffractometer, operating in the Bragg configuration using Cu Kα radiation ($\lambda$=1.54 Å). Samples for analyses were prepared by grinding powders thoroughly in ethanol using a mortar and pestle, followed by loading onto glass slides and subsequent drying in air. Diffraction patterns were collected from 20 to 80° at a scanning rate of 0.3°/min with a step size of 0.02°. Parameters used for slit widths and accelerating voltages were identical for all samples.

Electron Microscopy. The diameters and lengths of as-prepared nanowires/tubes were initially characterized using a field emission scanning electron microscopy instrument (FE-SEM Leo 1550), operating at an accelerating voltage of 15 kV and equipped with energy-dispersive X-ray spectroscopy (EDS) capabilities. Samples were first dispersed in ethanol, then sonicated for 1 min, and finally deposited onto Si wafers, which were ultimately attached onto the surfaces of SEM brass stubs using conductive carbon tape. Samples were then conductively coated with gold by sputtering for 20 s, so as to minimize charging effects under SEM imaging conditions.

For the creation of nanowire/nanotube arrays, membranes were initially attached to a piece of either double-sided conductive carbon tape or copper tape. The resulting aligned nanowire samples were created by immersion in either 1 M NaOH solution (for AAO membranes) for 0.5 h or in methylene chloride solution (for PC membranes) for 5 min to dissolve and remove the template. After washing steps with distilled water followed by air-drying, samples were subsequently mounted onto a variety of substrates for imaging.

Specimens for transmission electron microscopy (TEM) and high-resolution TEM (HRTEM) were obtained by drying droplets of as-prepared samples from an ethanolic dispersion, which had been sonicated for 1 min, onto a 300 mesh Cu grid, coated with a lacey carbon film. TEM images were then taken at an accelerating voltage of 120 kV on a Philips CM12 instrument. HRTEM images and SAED patterns were obtained on a JEOL 2010F HRTEM at an accelerating voltage of 200 kV. This instrument was equipped with an Oxford INCA EDS system with the potential of performing SAED to further characterize the crystallinity of as prepared samples.

Photoluminescence (PL). Photoluminescence data were obtained at 25° C. on a Jobin Yvon Spex Fluorolog 3 with a 1 s integration time. PL spectra for ZnO nanowires in water solution were obtained at an excitation wavelength of 325 nm. Prior to data collection, the nanowire solution was sonicated for approximately 30 s to obtain a visually nonscattering dispersion. Fluorescence data were taken immediately afterward.

Ultraviolet-Visible Spectra (UV-vis). UV-visible spectra were obtained at high resolution on a Thermospectronics UV1 spectrometer using quartz cells with a 10-mm path length. UV-visible absorption spectra were recorded using methanol as a blank.

Infrared Spectroscopy (IR). Mid-infrared spectra were recorded by using a Nicolet Nexus 470 FTIR spectrometer with a resolution of 4 cm$^{-1}$. Solid samples were prepared using a potassium bromide (KBr) pellet.

Photocatalytic Activity. To test the photocatalytic efficiency of as-prepared ZnO nanowires, a solution mixture of 10 mg/L methyl orange containing 1 g/L of ZnO nanowires in water was prepared. Prior to irradiation, the suspensions were sonicated for 10 min and then magnetically stirred in the dark for 30 min to establish an adsorption/degradation equilibrium. The suspension was subsequently irradiated under UV light (emission wavelength maximum at 366 nm) at a ~5 cm separation distance. Analogous control experiments were performed either without ZnO (blank) or in the presence of either a commercial bulk or a commercial nanoparticle (Nanostructured & Amorphous Materials, Inc., 20 nm) sample, normalized for identical metal oxide concentrations. Concentrations of methyl orange in the supernatant aliquots were subsequently analyzed by measuring the absorbance at 464 nm using a Thermospectronics UV1 spectrometer with 10-mm path length quartz cells.

For hematite nanotubes, a similar protocol was utilized with the exception that 4-chlorophenol (4-CP) was tested as opposed to methyl orange. The source for 20-50 nm commercial hematite nanoparticles was Nanostructured & Amorphous Materials, Inc. The concentration of 4-CP utilized was 6 mg/L and the amount of catalyst loading was set at 50 mg/L. The process for testing the photocatalytic efficiency of hematite nanotubes was essentially identical to the one for ZnO nanowires with the exception that absorbance was measured at an emission wavelength maximum of 225 nm.

Degradation of Hydrogen Peroxide. To probe the ability of as-prepared CuO nanowires to catalyze the degradation of $H_2O_2$, a 20 mL solution mixture containing 0.6 M $H_2O_2$ and 0.5 g/L CuO nanowires was initially prepared with rapid magnetic stirring. A 1 mL portion was removed every 30 min and the concentration of $H_2O_2$ in the subsequent pH-adjusted supernatant aliquots was subsequently analyzed by titration with a solution of 0.02 M $KMnO_4$ (Klassen et al., *Anal. Chem.* 1994, 66, 2921-2925). Analogous control experiments were performed either without CuO (blank) or in the presence of either a commercial bulk or a commercial nanoparticle (Nanostructured & Amorphous Materials, Inc., 30-50 nm) sample, normalized for identical metal oxide concentrations.

SQUID. Magnetization measurements were obtained using a Quantum Design magnetic property measurement system (MPMS) superconducting quantum interference device (SQUID) magnetometer, operated over a temperature range of 5-300 K, at an applied field of 100 Oe. Magnetization versus applied field measurements were obtained using H values from -5000 to 5000 Oe. Powder samples of as-prepared products were pressed lightly, loaded into a gel cap, and then covered with silica wool. The sample was held within a uniform drinking straw, which was attached to the sample rod of the MPMS apparatus. Signals generated by measurements of an empty sample holder demonstrated that the holder assembly contributes <1% to the overall magnetic signal.

Results and Characterization of Nanostructures

X-Ray Diffraction. It has been demonstrated in principle that, with the technique of the present invention, isolated 1D metal oxides of essentially any diameter can be obtained with templates of arbitrary pore size. The reason mainly samples prepared using 200 nm templates were used is because of the ability to generate sufficiently large quantities of these nanoscale materials to enable a more facile data interpretation of their unique properties.

The purity and crystallinity of as-prepared metal oxide nanostructure samples were initially examined by powder XRD measurements (FIG. 1). As shown in Table 2, all peaks of as-prepared samples can be readily indexed to pure phases of the desired materials. No detectable impurities were noted in any of the patterns. Thus, hexagonal-phase ZnO and monoclinic-phase CuO crystals were obtained at 80° C. without the necessity of an additional annealing step at high temperature.

By contrast, for the production of rhombohedral-phase $Fe_2O_3$, under identical experimental conditions (use of a polycarbonate (PC) template, at 80° C., same concentrations of precursors), the XRD pattern of the as-prepared sample (which incidentally was composed of 1D nanowire-like structures (sample K, Table 1) upon further analysis) was completely featureless. This diffraction result suggested that either little if any $Fe_2O_3$ crystals were produced or the as-prepared sample was effectively amorphous. Hence, it was hypothesized that further annealing was likely needed to increase sample crystallinity. However, since the PC template could only be used below 140° C. (beyond which it would deform, melt, or even decompose), the use of an AAO template was substituted. Resultant samples (in AAO) were annealed at 600° C. for 1 h. An XRD pattern (FIG. 1C, upper curve) showed that hematite ($\alpha$-$Fe_2O_3$) crystals (sample J, Table 1) could therefore be obtained, as planned.

Figure 2:
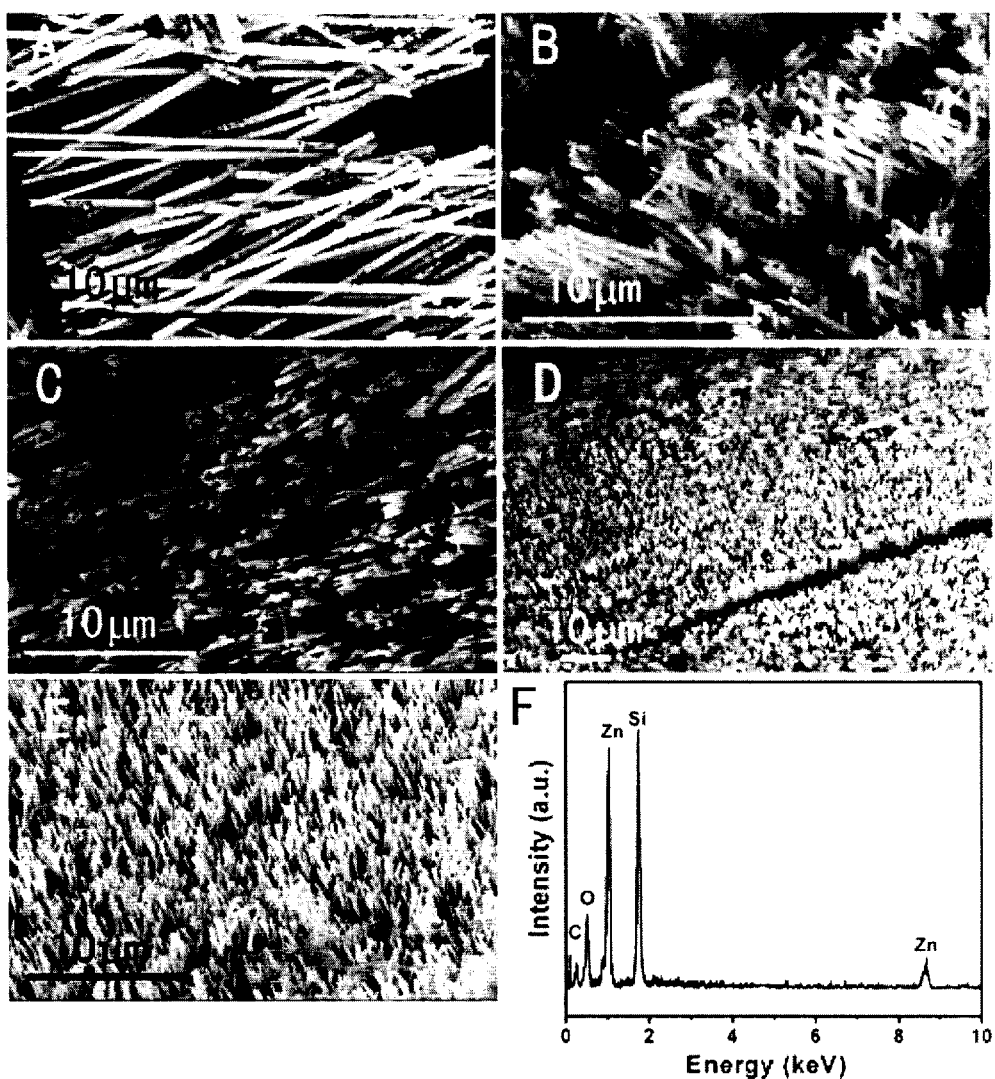
FIG. 2. SEM images of (A) isolated ZnO nanowires and (B) ZnO nanowires embedded in the template; (C-E) additional SEM images of ZnO nanowire arrays after removal of the template; representative EDS pattern (F) of as-prepared ZnO nanowires and arrays.
Figure 3:
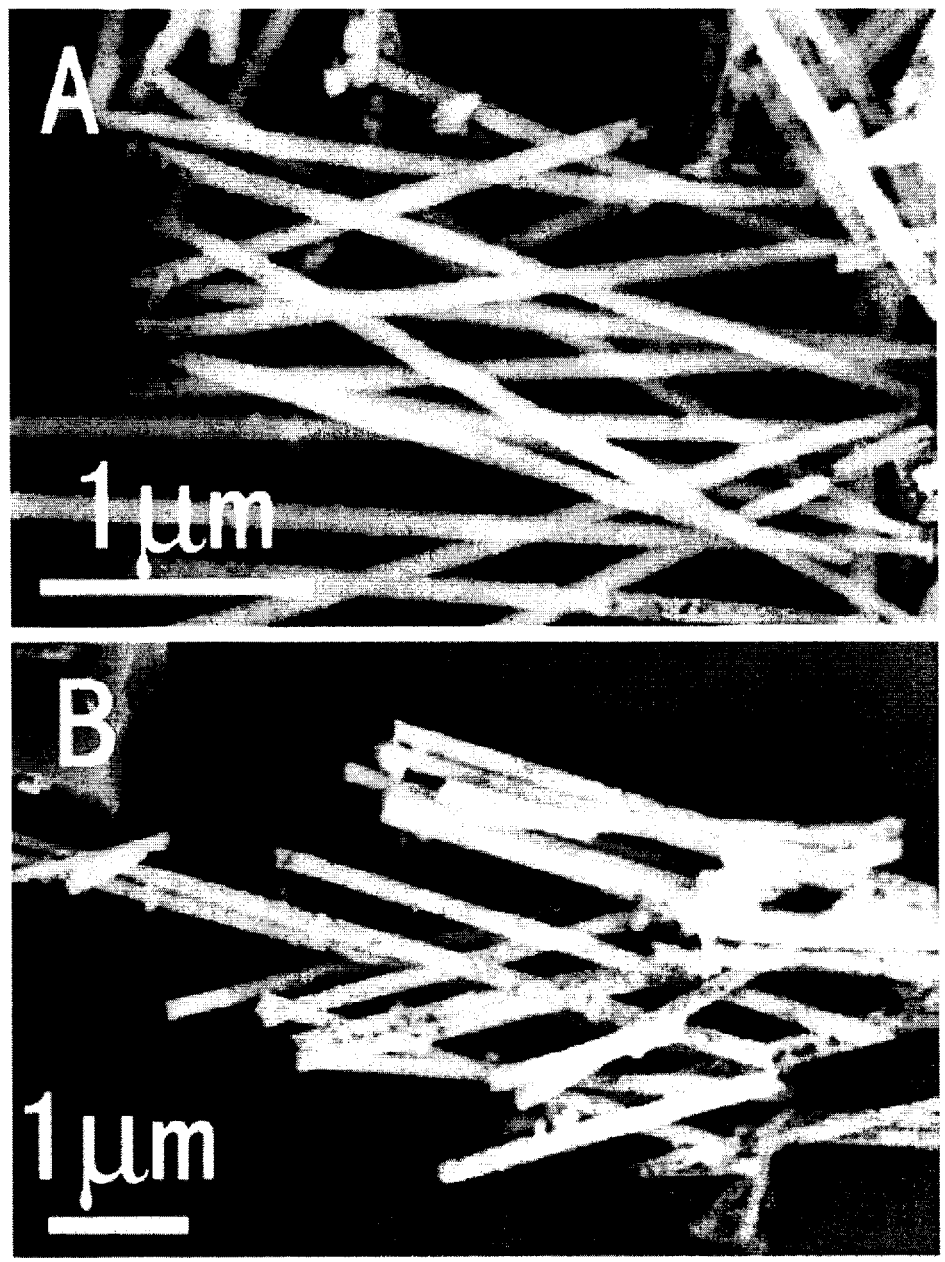
FIG. 3. Collection of SEM images of ZnO nanowires prepared from a PC template possessing pore sizes of (A) 50 nm and (B) 100 nm, respectively.

Electron Microscopy. The morphology of as-synthesized one-dimensional samples was studied using FE-SEM and TEM. FIG. 2A shows SEM images of as-prepared ZnO nanowires (sample C, Table 1), isolated from a 200 nm PC template. Diameters of these ZnO nanowires are about 250±50 nm, whereas the associated lengths measure about 10±1 μm. Additional images of ZnO nanowires (samples A and B, Table 1) grown in templates with pore diameters measuring 50 and 100 nm, respectively, are presented in FIG. 3. The diameters of these particular ZnO nanowires are 60±10 and 120±20 nm, respectively, consistent with the pore size dimensions of the originating templates themselves. FIG. 2B shows an image of samples with the template partially removed and with individual, aligned ZnO nanowires protruding vertically from the inner surfaces of the template pores. In this architecture, nanowire arrays are structurally supported by the presence of the remnant PC template which thereby increased the overall strength of the composite structure. This is significant because it is known that the power-generating capability of polymer-supported ZnO nanowire arrays is higher than that of corresponding arrays lacking any such mechanical support (Gao et al., *Adv. Mater.* 2007, 19, 67-72). In the experiments, arrays of ZnO nanowires appear to be structurally robust and well preserved, after careful and complete removal of the entire PC template by methylene chloride, as shown in FIG. 2C (top view) and in FIGS. 2D,E (tilt view). The EDS spectrum (FIG. 2F) shows the presence of Zn and O, as expected with the Si signal attributable to the underlying Si wafer used for imaging.

Figure 4:
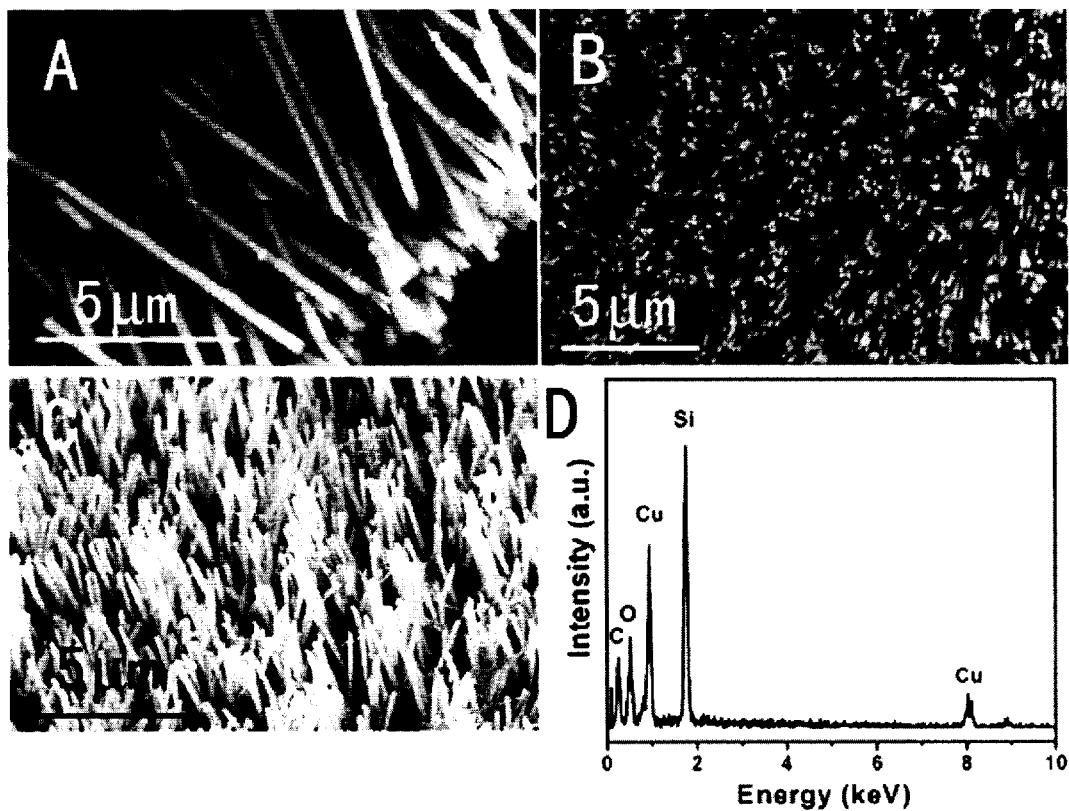
FIG. 4. SEM image of (A) isolated CuO nanowires; (B, top-view; C, tilt-view) SEM images of arrays of CuO nanowires after template removal; representative EDS pattern (D) of as-prepared CuO nanowires and associated nanowire arrays.

By analogy to ZnO, SEM data on isolated CuO nanowires are shown in FIG. 4A. Diameters and lengths are 250±50 nm and 12±2 μm, respectively. CuO nanowire arrays were also prepared in an analogous fashion to that of ZnO, that is, upon removal of the PC template, as shown in FIG. 4 panels B and C. The EDS spectrum (FIG. 4D) confirms the existence of Cu and O with the presence of Si attributable to the underlying Si wafer used for microscopy imaging.

Figure 5:
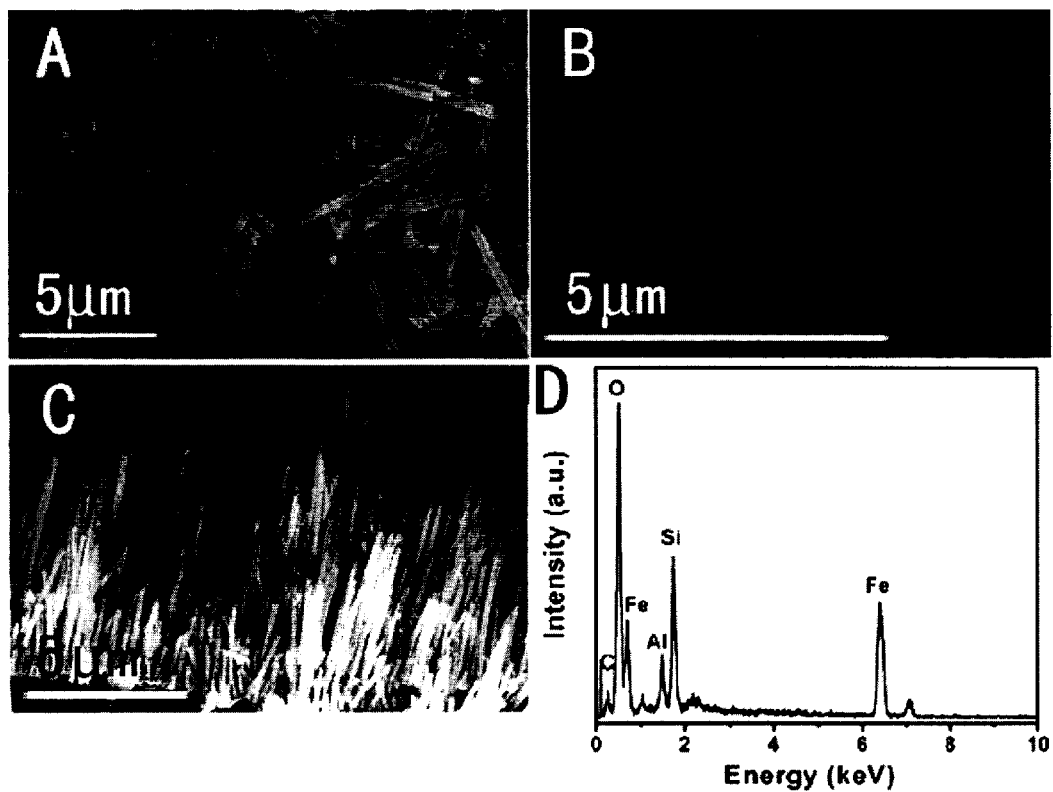
FIG. 5. SEM image of (A) isolated α-Fe$_2$O$_3$ nanotubes; SEM images of arrays of α-Fe$_2$O$_3$ nanowires before (B, top-view) and after (C, tilt-view) template removal; representative EDS pattern (D) of as-prepared α-Fe$_2$O$_3$ nanotubes and arrays.

As opposed to nanowires, hollow α-Fe$_2$O$_3$ nanotubes were obtained using AAO as the reaction template (FIG. 5A). Diameters and lengths of the as-obtained nanotubes measured approximately 260±60 nm and 6±3 μm, respectively. The existence of short nanotubes may arise from breakage of long nanotubes during the associated sonication process for TEM sample processing. Upon removal of a thin layer of AAO template, nanotubes can be clearly observed, growing within the pores of the template (FIG. 5B). However, it is evident that the nanotubes themselves are not actually attached to the inner surfaces of the pores. Shrinkage of the tubes toward the pore centers may have resulted from a loss of water upon annealing of Fe(OH)$_3$ (generated in situ from the reaction of Fe$_2$(SO$_4$)$_3$ and ammonium hydroxide) at high temperature. Arrays of aligned iron oxide nanotubes are shown in FIG. 5C after careful removal of the AAO template. The EDS spectrum (FIG. 5D) is consistent with the existence of Fe and O, whereas the Al signal originates from the remaining AAO template and the Si signal emanates from the Si wafer used in the imaging process. Additional SEM images of all of these metal oxide samples, highlighting the prevalence of the reaction, are shown in Figure S2.

Figure 6:
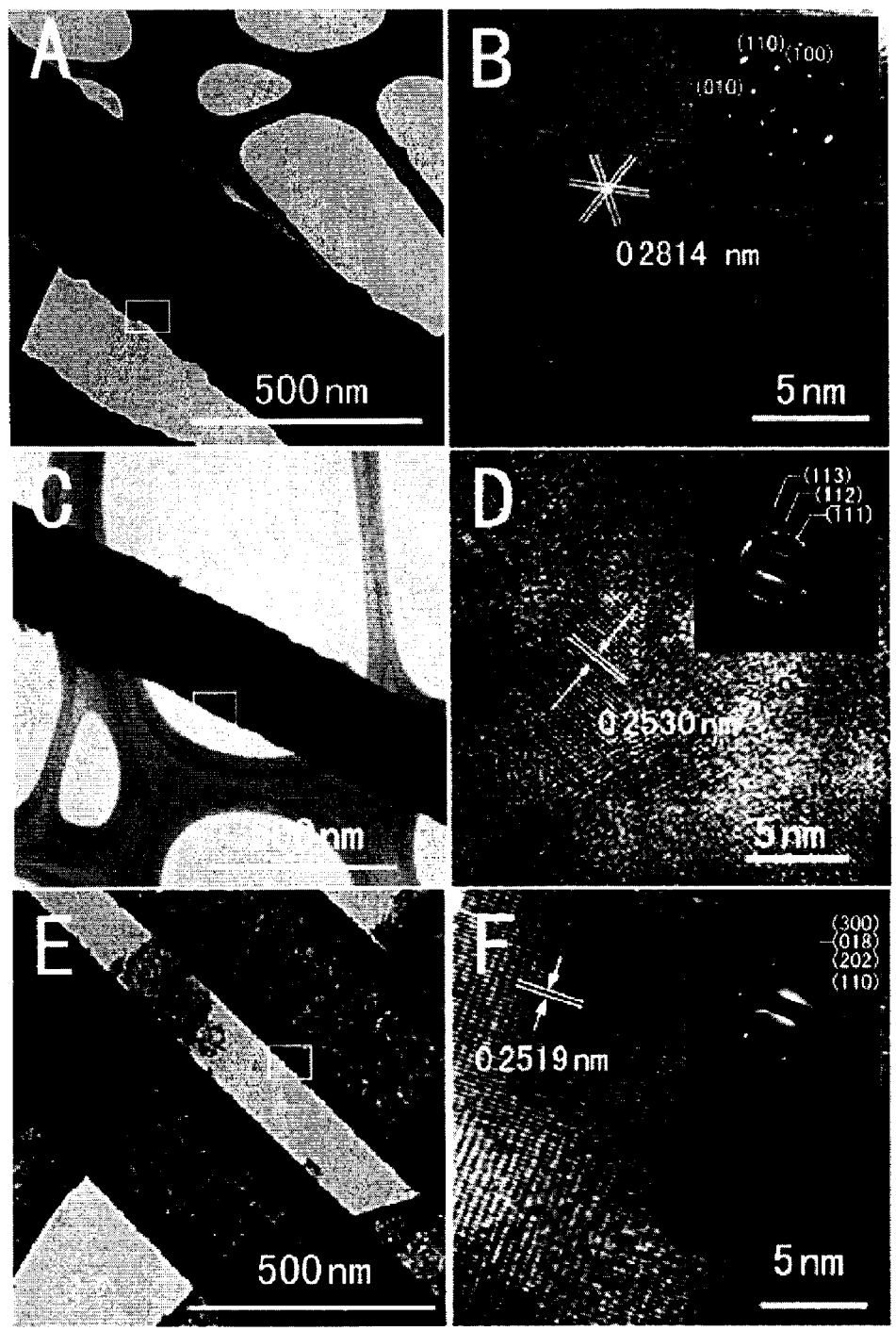
FIG. 6. TEM (A,C,E) and HRTEM (B, D, F) images and corresponding SAED patterns (insets) of portions of ZnO nanowires (top); CuO nanowires (middle), and α-Fe$_2$O$_3$ nanotubes (bottom), respectively. Squares in panels A, C, and E highlight spatially specific locations on the various nanoscale oxide samples, where the HRTEM images were taken.

The morphology of all of the samples was also examined by low-magnification TEM as shown in FIG. 6 panels A, C, and E as well as Figure S3. These images further confirm the range of sample diameters obtained from SEM data. All as-obtained nanowires and nanotubes are essentially uniform in terms of shape and morphology.

A high resolution TEM image (FIG. 6B) and associated SAED pattern (inset to FIG. 6B) taken on an individual ZnO nanowire show the single crystalline nature of the sample. The lattice spacing can be indexed to the (100) plane. SAED patterns obtained at different spots along the same nanowire were effectively identical and confirm that each ZnO nanowire is essentially uniform in composition and relatively devoid of impurities. By contrast, although a similar procedure was used to generate CuO nanowires, the resulting product was not single crystalline. That is, a HRTEM image (FIG. 6D) of a CuO nanowire shows the presence of different crystalline domains and SAED (inset to 6D) confirms that it is polycrystalline. The lattice spacing of the crystal domain indexed corresponds to (−111). Moreover, as-generated α-Fe$_2$O$_3$ nanotubes consist of many small but misoriented single-crystalline nanocrystalline domains (FIGS. 6E and F), rendering the entire structure as polycrystalline in nature (inset in FIG. 6F). The lattice spacing taken from one of these single-crystalline particles has been ascribed to the (110) plane. Considering that these iron oxide structures were prepared using an annealing step at high temperature, this result is not altogether surprising.

Figure 7:
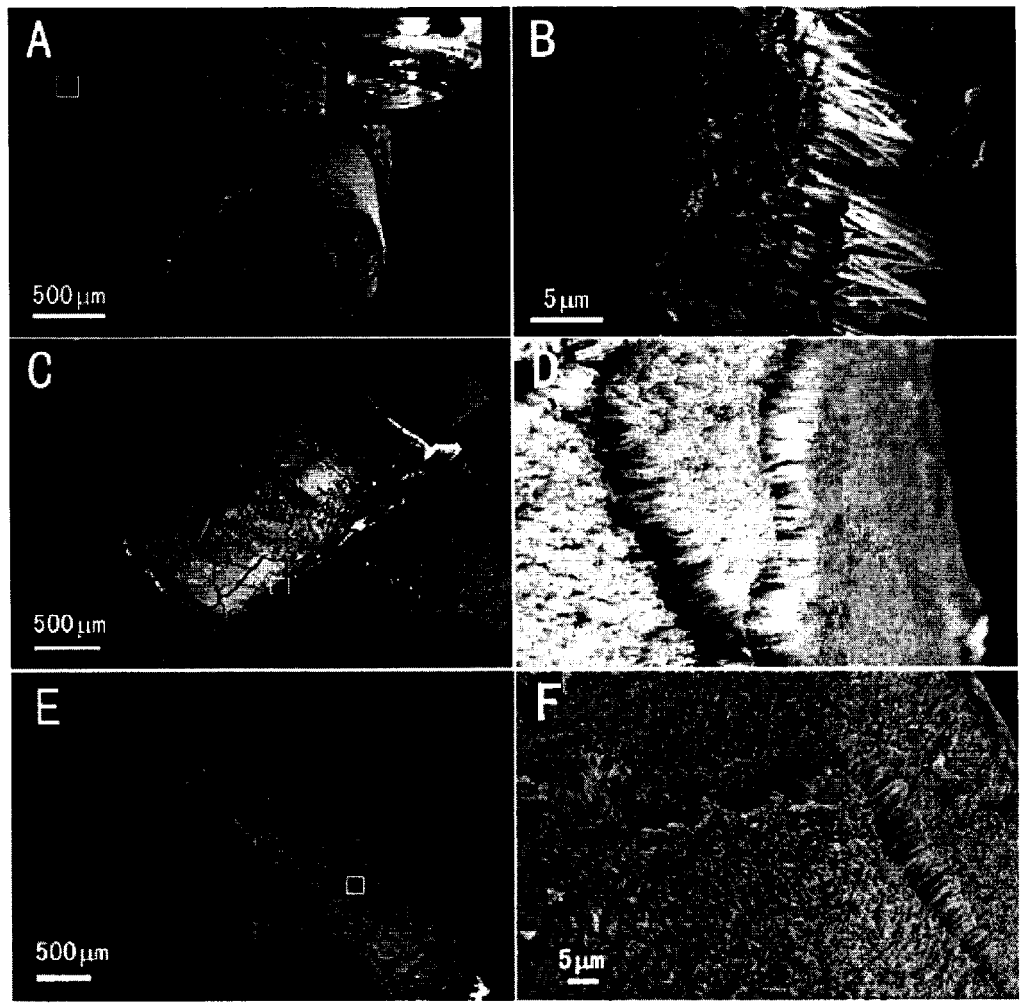
FIG. 7. SEM images of CuO nanowire arrays immobilized onto (A and B) a plastic tip as well as onto (C and D) a curved glass rod. (E and F) Analogous SEM images of ZnO nanowire arrays immobilized onto a curved glass rod.

Array structures of the nanowire samples were also generated. The protocol al-lows for the transference of any type of metal oxide array motifs onto a nonspecific substrate, nonlinear or otherwise, using double-sided, conductive tape. As a demonstration of principle of the ability to pattern metal oxide nanowire arrays over macroscopically relevant areas, CuO arrays were attached onto curved substrates of varying chemical composition. FIG. 7 panels A and B are SEM images of CuO arrays immobilized using conductive carbon tape onto a plastic tip, measuring 1.5 mm in outer diameter. FIG. 7B corresponds spatially to the white square designated in FIG. 7A and highlights the feasibility of generating vertically aligned metal oxide arrays at room temperature. FIGS. 7C and 7D (magnified view corresponding spatially to the white square shown in 7C) show the presence of CuO arrays immobilized onto a silica glass rod, measuring 0.8 mm in outer diameter, as mediated by the presence of conductive, copper tape. By analogy, ZnO arrays were attached onto an identical silica glass rod, as shown in FIGS. 7E and 7F (magnified view corresponding spatially to the white square shown in 7E), using conductive, copper tape. The array integrity was even more highly preserved in the case of ZnO and CuO nanowire arrays, partly because methylene chloride, used to remove the PC template, is not as corrosive to the intrinsic structure of copper tape as it is to carbon tape.

This technique, involving an initial nanoscale oxide nanowire formation inside a template followed by attachment to the desired substrate using conductive tape and subsequent template removal, is significant not only because this generalizable protocol can be performed under ambient conditions for essentially any type of material but also because this procedure can transfer arrays onto any type of substrate of any geometric configuration over a reasonably large macroscopic area, a capability which is technically relevant. Moreover, the reported methodology is effectively independent of the mechanical deformability, melting behavior, and/or decomposition temperature of the substrate onto to which the arrays are transferred, and furthermore, it does not necessitate the use of catalytic seed particles, all of which are important factors in conventional methods traditionally associated with array patterning. Also chemically distinctive types of metal oxide arrays can be attached in spatially adjacent positions onto a given substrate using simplistic technique of the present invention.

Figure 8:
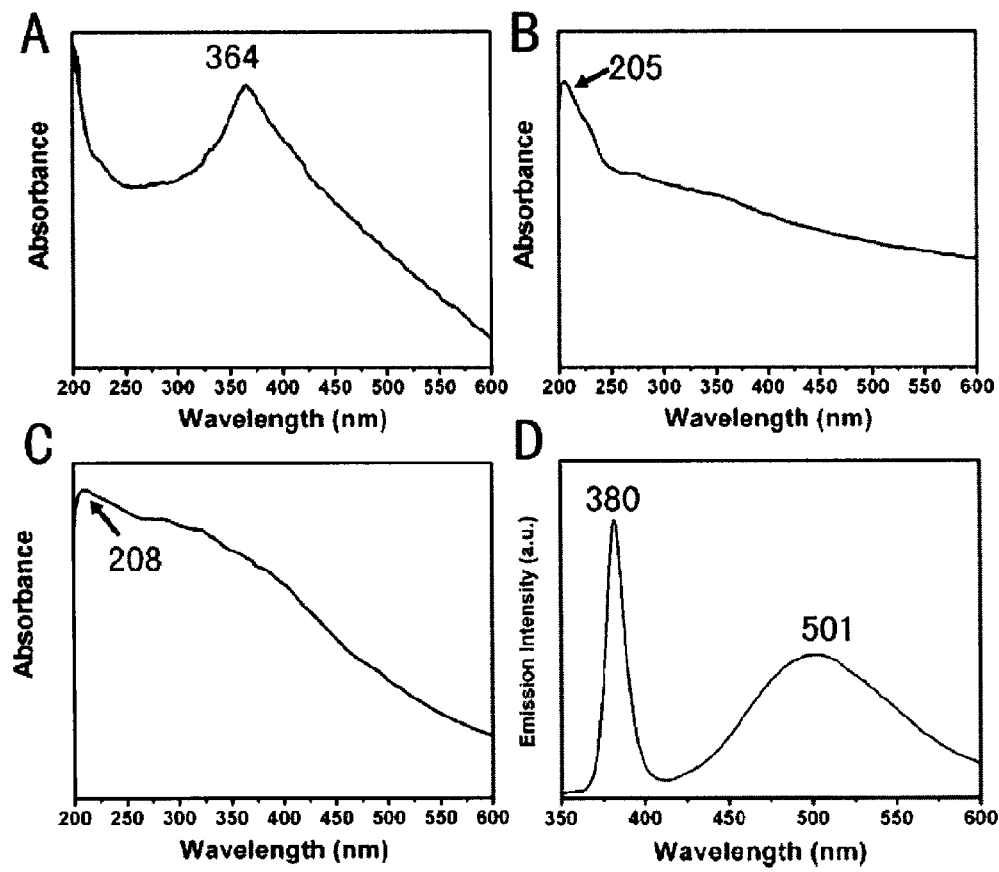
FIG. 8. UV-visible spectra of as-prepared (A) ZnO nanowires, (B) CuO nanowires, and (C) α-Fe$_2$O$_3$ nanotubes; (D) photoluminescence spectrum of ZnO nanowires (excitation wavelength of 325 nm).

Optical Spectroscopy. Optical properties of as-prepared samples were also investigated. FIG. 8 shows the UV-visible spectra of as-prepared samples. The absorption spectrum (FIG. 8A) of the ZnO nanowires showed the presence of a maximum absorption peak at 364 nm, which blue-shifted relative to that of the corresponding signal for bulk ZnO, in agreement with prior work (Prasad et al., Acta, Part A 2006, 65, 173-178; Snitka et al., Mater. Lett. 2007, 61, 1763-1766). By analogy, the maximum absorption peaks of CuO nanowires and of α-Fe$_2$O$_3$ nanotubes (FIGS. 8B and 8C) were noted at 205 and 208 nm, respectively, which also showed a blue-shift relative to that of their bulk counterparts, consistent with previous reports (Wang et al., J. Phys. Chem. C 2007, 111, 3551-3554; Kaur et al., J. Cryst Growth 2006, 289, 670-675). Essentially, with decreasing sample size, the optical edge shifts to higher energy, a phenomenon attributable to quantum size and confinement effects (Zhou et al., J. Mater. Res. 2006, 21, 2941-2947). Indeed, a size-dependent blue-shift has been observed in the absorption spectra of nanocrystalline motifs of many other bulk materials, such as TiO$_2$ nanowires (Mao et al., J. Am. Chem. Soc. 2006, 128, 8217-8226).

The room temperature photoluminescence (PL) spectrum of ZnO nanowires is shown in FIG. 8D. A strong UV emission observed at ~380 nm most likely corresponds to near band-edge emission, while the presence of green emission at ~501 nm can be attributed to radiative recombination of photogenerated holes in the valence band with electrons in singly occupied oxygen vacancies (Greene et al., Chem., Int. Ed. 2003, 42, 3031-3034; Huang et al., Adv. Mater. 2001, 13, 113-116; Vanheusden et al., J. Appl. Phys. 1996, 79, 7983-7990).

Moreover, evidence for the formation of metal oxides was provided by FT-IR spectra, shown in Figure S4. The broad absorption band around 500 cm$^{-1}$ of the ZnO sample can be attributed to either the stretching mode of ZnO (Prasad et al., Acta, Part A 2006, 65, 173-178; Maensiri et al., J. Cryst. Growth 2006, 289, 102-106) or an oxygen vacancy defect complex (Xiong et al., J. Appl. Phys. 2007, 101, 024317-1-024317-6; Kaschner et al., Appl. Phys. Lett. 2002, 80, 1909-1911) in that compound. By analogy, the maximum absorption band at around 520 cm$^{-1}$ of the CuO sample corresponds to the broad stretching mode of CuO along the [101] direction (Amores et al., *J. Mater. Chem.* 1994, 4, 965-971; Borgohain et al., *Phys. Rev. B* 2000, 61, 11093-11096). Finally, for the α-Fe$_2$O$_3$ sample, the presence of bands located at 580 cm$^{-1}$ and 485 cm$^{-1}$ is consistent with the presence of $A_{2u}/E_u$ and $E_u$ vibrations, respectively (Wang et al., *Colloids Surf A* 1998, 134, 281-297; Musić et al., *Mater. Lett.* 1997, 32, 301-305; Chernyshova et al., *Phys. Chem. Chem. Phys.* 2007, 9, 1736-1750).

Figure 9:
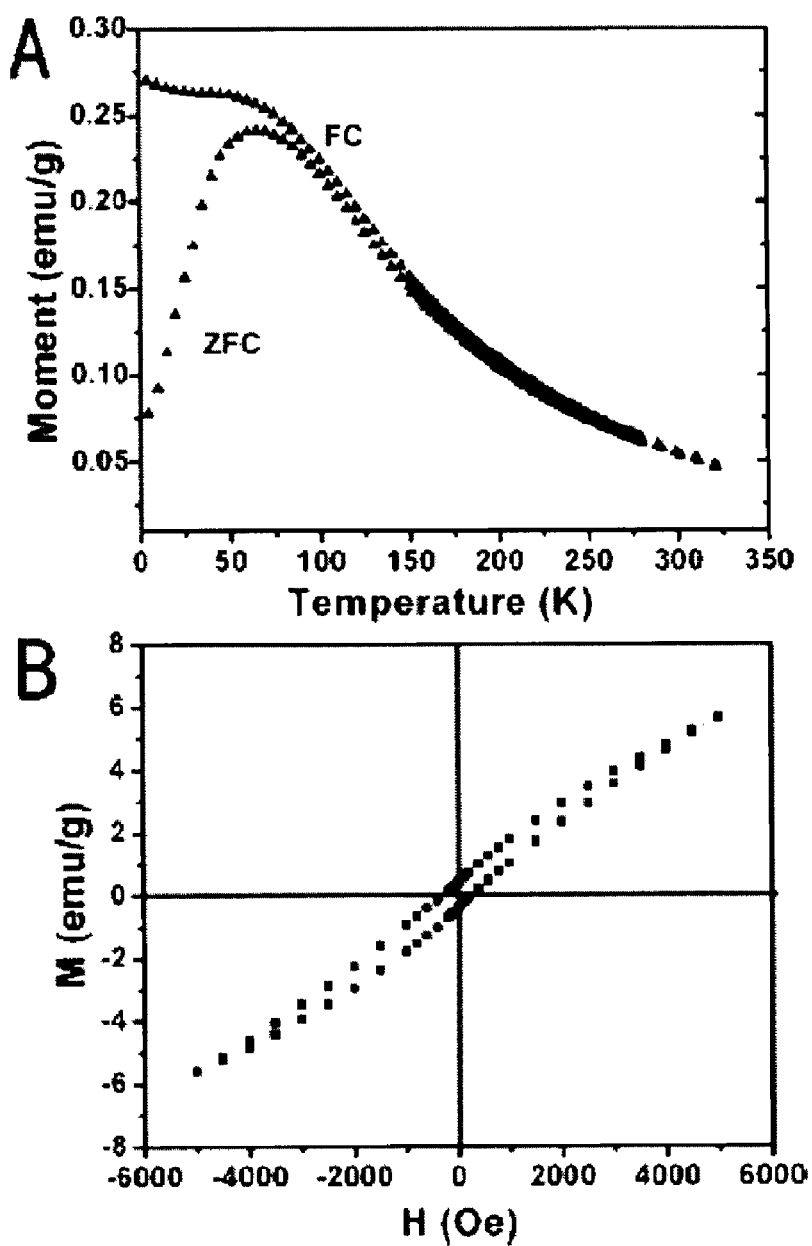
FIG. 9. (A) Temperature dependence of the magnetic susceptibility for α-Fe$_2$O$_3$ nanotubes, showing zero field cooling (ZFC) and field cooling (FC) curves, with an applied magnetic field set at 100 Oe; (B) hysteresis loop at 5 K revealing the coercivity of as-prepared hematite nanotubes.

Magnetic Behavior. The magnetic behavior of as-prepared α-Fe$_2$O$_3$ nanotubes was investigated using SQUID analysis. Field-cooled and zero-field-cooled magnetization curves under 100 Oe are shown in FIG. 9A. The magnetic phase transition from the canted ferromagnetic phase to another antiferromagnetically ordered state has been reported for bulk hematite samples to be around 260 K, characterized by a sharp decrease in the magnetization in the so-called Morin transition (Morin et al., *Phys. Rev.* 1950, 78, 819-820). The magnetic behavior of the α-Fe$_2$O$_3$ nanotubes of the present invention was different though. The results are in agreement with analogous data observed for a hydrothermally prepared α-Fe$_2$O$_3$ nanotube sample (Liu et al., *J. Phys. Chem. B.* 2006, 110, 15218-15223) as well as for spherical α-Fe$_2$O$_3$ nanoparticles (Zysler et al., *Physica B* 2006, 384, 277-281). For instance, for the template-prepared nanotubes, a hysteresis loop at 5 K (FIG. 9B) was observed, indicative of the presence of a coercive field at 245 Oe, characteristic of a soft magnet; by analogy, hydrothermally prepared nanotubes yielded a coercive field of 280 Oe (Liu et *J. Phys. Chem. B* 2006 110, 15218-15223). These results are suggestive of a long-range magnetic ordering, suppressing the Morin transition. Moreover, it can be observed that the α-Fe$_2$O$_3$ nanotubes show a well-defined peak at 65 K, below which the magnetic moments of particles are frozen or blocked; by analogy, for spherical α-Fe$_2$O$_3$ nanoparticles, that blocking temperature was 45 K (Zysler et al., *Physica B* 2006, 384, 277-281). The FC curve above the blocking temperature does not follow standard Curie-Weiss behavior, suggesting the presence of strong intertube interactions. As these behaviors cannot be ascribed to any magnetic impurities in the samples, the overall observations herein can potentially be assigned to structural disorder, such as the presence of small crystalline particulate regions, an assertion supported by the polycrystalline nature of the iron oxide tubes, as evidenced by the TEM/HRTEM images in FIGS. 6E,F. In addition, morphology, finite size, and surface effects are additionally important factors, since hematite nanocubes (Wang et al., *J. Phys. Chem.* C2007, 111, 3551-3554) also behave magnetically distinctively as compared with the bulk.

Figure 10:
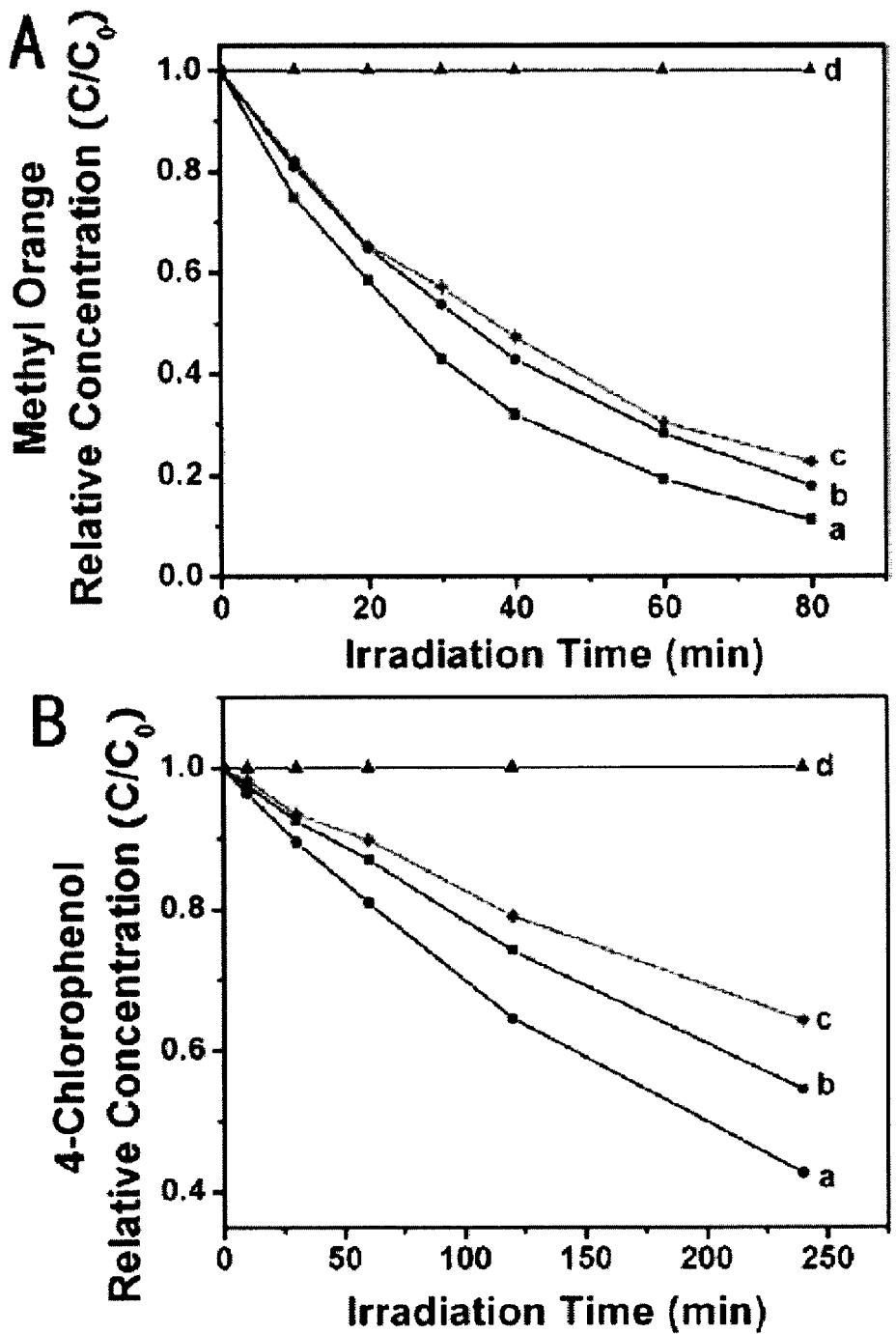
FIG. 10. (A) Photodegradation of methyl orange in the presence of (a) ZnO nanowires, (b) ZnO nanoparticles, (c) ZnO bulk, and (d) a blank control. (B) Photodegradation of 4-chlorophenol in the presence of (a) α-Fe$_2$O$_3$ nanotubes, (b) α-Fe$_2$O$_3$ nanoparticles, (c) α-Fe$_2$O$_3$ bulk, and (d) a blank control.

Photocatalytic Measurements. Semiconductor-assisted photocatalysis and photo-oxidation of organic contaminants, as exemplified by model organic systems, remain as reasonable methodologies for converting pollutants into relatively harmless byproducts. The photocatalytic potential of as-prepared ZnO nanowires was evaluated by measuring the absorption intensity of methyl orange at 464 nm upon photo-excitation with UV light at 366 nm. The data clearly show that nanowires and nanoparticles as well as the bulk sample of ZnO are active photocatalysts, as illustrated in FIG. 10A. The nanowire samples exhibited a slightly higher photoactivity as compared with that of both bulk and nanoparticle samples and that observed enhancement of photocatalytic activity is most likely related to a relative increase in the purity and crystallinity of the nanowires of the present invention. Moreover, because the absorption spectrum of ZnO nanowires is shifted to higher energy with respect to that of the bulk as well as of commercial nanoparticles, the corresponding increase in sensitivity of the nanowires toward that part of the optical spectrum may also account for the larger amount of associated photoactivity noted (Zhou et al., *J. Mater. Res.* 2006, 21, 2941-2947). Similar morphology dependent trends in photocatalytic behavior have been previously reported for anatase TiO$_2$ (Mao et al., *J. Am. Chem. Soc.* 2006 128, 8217-8226). A similar enhancement of photocatalytic activity was also observed for as-prepared α-Fe$_2$O$_3$ nanotubes as compared with that of the nanoparticles and bulk in the decomposition reaction (Bandara et al., *Appl. Catal., B* 2007, 76, 73-81) of 4-chlorophenol (4-CP) to $CO_2$, $H_2O$, and HCl on the basis of changes in the intensity of the 4-CP absorption peak at 225 nm (FIG. 10B).

It was determined that both of these photodegradation reactions were pseudo-first-order reactions. From the data in Figure S5, apparent reaction rate constants of methyl orange degradation for ZnO nanowires, nanoparticles, and the corresponding bulk samples were calculated to be $2.77 \times 10^{-2}$, $2.13 \times 10^{-2}$, and $1.92 \times 10^{-2}$ min$^{-1}$, respectively. By analogy, rate constants for the photocatalytic degradation reaction of 4-chlorophenol by α-Fe$_2$O$_3$ nanotubes, nanoparticles, and the corresponding bulk samples were deduced to be $3.60 \times 10^{-3}$, $2.49 \times 10^{-3}$, and $1.86 \times 10^{-3}$ min$^{-1}$, respectively.

Figure 11:
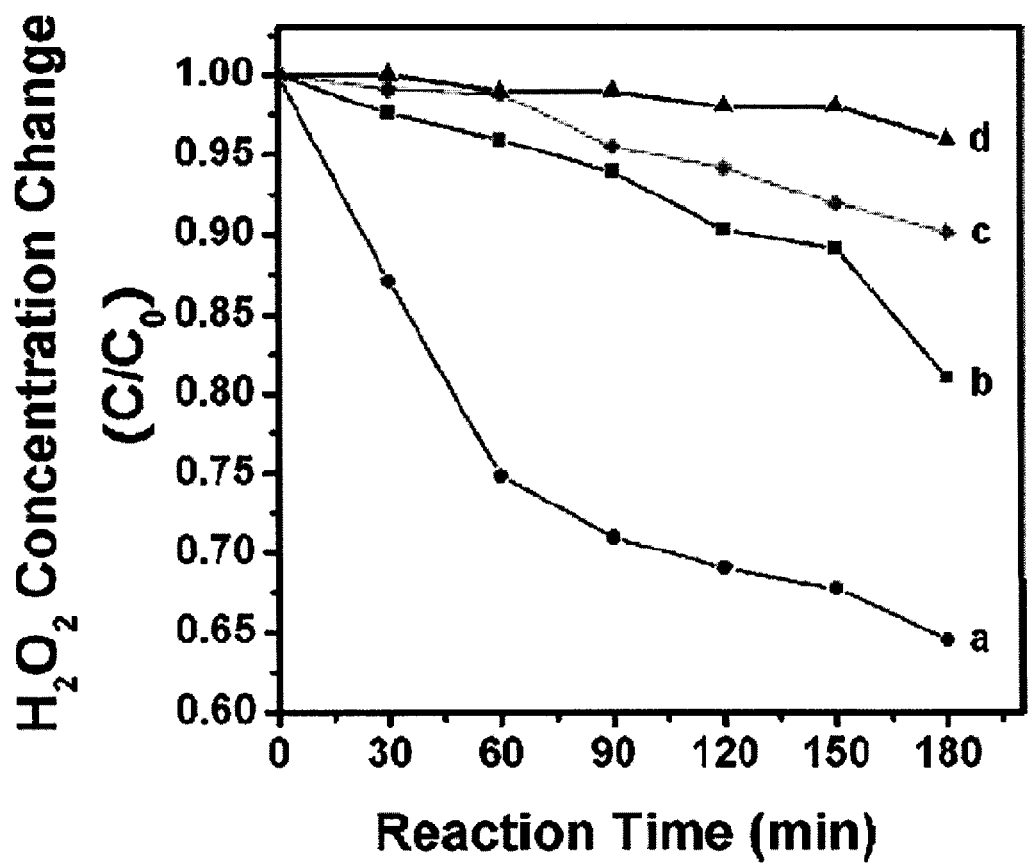
FIG. 11. Degradation of H$_2$O$_2$ in the presence of (a) CuO nanowires, (b) CuO nanoparticles, (c) CuO bulk, and (d) a blank control.

Degradation of Hydrogen Peroxide. Metal oxides are known to effectively catalyze the degradation of $H_2O_2$, a model compound for the degradation of organic species (Drijvers et al., *Water Res.* 1999, 33, 1187-1194). The effect of CuO in catalyzing the degradation of $H_2O_2$ through a heterogeneous process is shown in FIG. 11. It was found that the concentration of $H_2O_2$ decreased much more quickly in the presence of CuO nanowires and nanoparticles as compared with that of the CuO bulk. In fact, after 3 h of reaction, an approximately 35% and 19% loss of $H_2O_2$ with CuO nanowires and nanoparticles, respectively, was noted as compared with only a 10% reduction of hydrogen peroxide in the presence of bulk CuO. The small, observed enhancement of photocatalytic activity of the nanowires, relative to that of both commercial bulk and nanoparticle samples, may be related to a rise in CuO crystallinity and chemical purity, characteristic of the as-prepared nanostructures.

Further Observations

The template technique of the present invention allows for reasonably short reactions to be run under mild, ambient conditions in aqueous solution with reliable control over shape, dimensionality, and crystallinity, originating from the spatial geometry of the confining porous template environment. The technique is a reliable and reproducible synthesis of not only isolated structures (measuring 50-200 nm in diameter and several micrometers in length) but also of arrays of ZnO, CuO, and α-Fe$_2$O$_3$ over spatially relevant, macroscopic (cm$^2$) areas of various types of substrates (i.e., not only flat silicon surfaces but also curved glass rods). In addition, size- and shape-dependent optical, magnetic, and catalytic properties of these as-prepared 1D metal oxides were investigated and noted to be mainly comparable with or better than the associated properties of the corresponding bulk oxides.

Moreover, it is possible to control morphology by tuning the nature of the physicochemical interactions between reagent molecules and the pore walls, for instance, either (i) by chemically modifying the hydrophilicity, hydrophobicity, and surface charge of the internal pore sidewalls or (ii) by physically altering reagent concentration, reaction pH, reaction temperatures, and reaction times. This is a particularly advantageous strategy when the metal oxide nanoscale material is difficult to generate by other conventional means.

TABLE 1

Effect of Parameter Selection on Preparation of Metal Oxide 1-D Nanostructures at a Constant Overall Reaction Time of 1 h.

| sample | metal salts used | basic solution | concn of base (M) | temp (° C.) | template | observed product morphology (width, W; length, L; diameter, D) |
|---|---|---|---|---|---|---|
| A | $Zn^{2+}$ | NaOH | 0.1 | 80 | polycarbonate | ZnO nanowires. W: 60 ± 10 nm. L: 2-4 μm |
| B | $Zn^{2+}$ | NaOH | 0.1 | 80 | polycarbonate | ZnO nanowires. W: 120 ± 20 nm. L: 2.5-5 μm |
| C | $Zn^{2+}/Cu^{2+}$ | NaOH | 0.1 | 80 | polycarbonate | ZnO/CuO nanowires. W: 250 ± 50 nm. L: 10-15 μm |
| D | $Zn^{2+}/Cu^{2+}$ | NaOH | 0.01 | 80 | polycarbonate | ZnO/CuO nanowires. W: 250 ± 50 nm, L: 1-2 μm ZnO/CuO nanoparticles. D: 90 ± 30 nm |
| E | $Zn^{2+}/Cu^{2+}$ | NaOH | 0.1 | room temp | polycarbonate | $Zn(OH)_2/Cu(OH)_2$ nanowires. W: 250 ± 50 nm. L: 4-8 μm |
| F | $Zn^{2+}/Cu^{2+}$ | $NH_3 \cdot H_2O$ | 0.01 | room temp | polycarbonate | $Zn(OH)_2/Cu(OH)_2$ nanoparticles. D: 90 ± 30 nm |
| G | $Zn^{2+}/Cu^{2+}$ | $NH_3 \cdot H_2O$ | 0.01 | room temp | alumina | $Zn(OH)_2/Cu(OH)_2$ nanoparticles. D: 90 ± 30 nm |
| H | $Fe^{3+}$ | $NH_3 \cdot H_2O$ | 0.01 | room temp | alumina | $Fe(OH)_3$ nanotubes. W: 300 ± 50 nm. L: 3-9 μm |
| I | $Fe^{3+}$ | $NH_3 \cdot H_2O$ | 0.1 | room temp | alumina | $Fe(OH)_3$ nanotubes. W: 300 ± 50 nm. L: 4-12 μm |
| J | $Fe^{3+}$ | $NH_3 \cdot H_2O$ | 0.01 | (a) room temp; (b) annealing to 600° C. | alumina | $\alpha$-$Fe_2O_3$ nanotubes. W: 260 ± 6 nm. L: 3-9 μm |
| K | $Fe^{3+}$ | NaOH | 0.1 | 80 | polycarbonate | amorphous $Fe_2O_3$ (or $\beta$-FeOOH) nanowires. W: 250 ± 50 nm: L: 4-5 μm |
| L | $Fe^{3+}$ | $NH_3 \cdot H_2O$ | 0.01 | room temp | polycarbonate | $Fe(OH)_3$ nanoparticles. D: 100 ± 20 nm |

Measured 1-D Nanostructure Widths (W) Are Dependent on Corresponding Pore Dimensions of Templates Used

TABLE 2

Crystallographic Data of as-Prepared Samples and Comparisons with Expected Literature Values

| sample | JCPDS database No. | phase (space group) | calculated constants | literature values |
|---|---|---|---|---|
| ZnO nanowires | 36-1451 | Hexagonal (P63mc) | a = 0.3249 nm c = 0.5206 nm | a = 0.3249 nm c = 0.5206 nm |
| CuO nanowires | 45-0937 | Monoclinic (C2/c) | a = 0.4685 nm b = 0.3426 nm c = 0.5130 nm | a = 0.4685 nm b = 0.3425 nm c = 0.5130 nm |
| $\alpha$-$Fe_2O_3$ nanotubes | 33-0664 | Rhombohedral (R3c) | a = 0.5036 nm c = 1.3749 nm | a = 0.5035 nm c = 1.3740 nm |

The invention claimed is:

1. A method of producing a crystalline metal oxide nanostructure, the method comprising:
   providing a metal salt solution and providing a basic solution;
   placing a porous membrane between the metal salt solution and the basic solution, wherein metal cations of the metal salt solution and hydroxide ions of the basic solution react to form metal hydroxides; and
   dehydrating the metal hydroxides at about 80 to 700° C., thereby producing a crystalline metal oxide nanostructure;
   wherein the crystalline metal oxide nanostructure has the formula $M_xO_y$, wherein x is 1, 2, 3, 4 or 5, and y is 1, 2, 3, 4, 7 or 8.

2. A method of claim 1 wherein the metal salt in the metal salt solution is selected from the group consisting of zinc salt, copper salt, iron salt, cobalt salt, nickel salt, magnesium salt, manganese salt, scandium salt, thallium salt, tin salt, aluminum salt, cadmium salt, and chromium salt.

3. A method of claim 1 wherein the metal salt in the metal salt solution is selected from the group consisting of yttrium salt, zirconium salt, vanadium salt, ruthenium salt, tungsten salt, bismuth salt, barium salt, calcium salt, strontium salt, osmium salt, gallium salt, germanium salt, antimony salt, niobium salt, rhenium salt and lead salt.

4. A method of claim 1 wherein the metal oxide nanostructure is single crystalline.

5. The method of claim 1 wherein the metal oxide nanostructure is polycrystalline.

6. The method of claim 1 wherein metal cations and hydroxide ions predominantly nucleate to form metal hydroxides within the confines of the pores of the porous membrane.

7. The method of claim 1 wherein the metal cations and hydroxide ions predominantly nucleate at the walls of the pores of the porous membrane.

8. The method of claim 1 wherein the basic solution has a pH of greater than or equal to 13, the membrane is a polycarbonate membrane, and zinc oxide nanowires are produced.

9. The method of claim 1 wherein the basic solution has a pH of greater than or equal to 13, the membrane is a polycarbonate membrane, and copper oxide nanowires are produced.

10. The method of claim 1 wherein the basic solution has a pH of greater than or equal to 13, the membrane is an alumina membrane, and hematite nanotubes are produced.

11. The method of claim 1 wherein the method further comprises controlling the dimensions and morphology of the nanostructures to form nanowires and/or nanorods, wherein the porous membrane is a homogeneous type membrane; wherein as the pH of the basic solution increases, the length of the nanowires and/or nanorods increases;
   wherein as the temperature of the reaction increases, the length of the nanowires and/or nanorods increases.

12. The method of claim 1, wherein M is selected from the group consisting of Zn, Cu, Fe, Co, Ni, Mg, Mn, Sc, Tl, Sn, Al, Cd and Cr; and wherein the nanostructure is a nanotube, a nanowire or nanorod.

13. The method of claim 12 wherein x is 1 or 2, and y is 1 or 3.

14. The method of claim 1 wherein the crystalline metal oxide nanostructure is a nanoarray comprising a plurality of one-dimensional nanostructures, and wherein M is selected from the group consisting of Zn, Cu, Fe, Co, Ni, Mg, Mn, Sc, Tl, Sn, Al, Cd and Cr.

15. The method of claim 14, wherein x is 1 or 2, and y is 1 or 3.

16. The method of claim 14, wherein the nanoarray is at least 50% monodisperse.

* * * * *